United States Patent
Papasakellariou

(10) Patent No.: US 11,792,785 B2
(45) Date of Patent: Oct. 17, 2023

(54) ENHANCING SCHEDULING FLEXIBILITY FOR OPERATION WITH CARRIER AGGREGATION

(71) Applicant: Samsung Electronics Co., Ltd., Suwon-si (KR)

(72) Inventor: Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 218 days.

(21) Appl. No.: 17/446,712

(22) Filed: Sep. 1, 2021

(65) Prior Publication Data

US 2022/0086867 A1    Mar. 17, 2022

Related U.S. Application Data

(60) Provisional application No. 63/078,489, filed on Sep. 15, 2020.

(51) Int. Cl.
*H04W 72/04* (2023.01)
*H04W 72/12* (2023.01)
(Continued)

(52) U.S. Cl.
CPC ..... *H04W 72/1263* (2013.01); *H04W 72/044* (2013.01); *H04W 72/23* (2023.01)

(58) Field of Classification Search
CPC ..... H04L 5/0053; H04L 5/0044; H04L 5/001; H04W 72/044; H04W 72/23; H04W 72/1263

See application file for complete search history.

(56) References Cited

U.S. PATENT DOCUMENTS

2012/0287878 A1\* 11/2012 Moon .................. H04L 5/001
                                                           370/329
2018/0027530 A1    1/2018 McBeath et al.
(Continued)

FOREIGN PATENT DOCUMENTS

WO    2019143164 A1    7/2019

OTHER PUBLICATIONS

"5G; NR; Physical channels and modulation (3GPP TS 38.211 version 16.2.0 Release 16)", ETSI TS 138 211 V16.2.0, Jul. 2020, 136 pages.
(Continued)

*Primary Examiner* — Maharishi V Khirodhar
*Assistant Examiner* — Kenneth P Hunt

(57) ABSTRACT

Methods and apparatuses for enhancing scheduling flexibility for operation with carrier aggregation. A method for processing downlink control information (DCI) formats includes receiving a first physical downlink control channel (PDCCH) on a first cell that provides a first DCI format and determining a set of fields in the first DCI format. The first DCI format schedules a first physical downlink shared channel (PDSCH) reception, or physical uplink shared channel (PUSCH) transmission, only on the first cell. The set of fields includes a carrier indicator field (CIF) when a second DCI format provided by a second PDCCH reception on a second cell can schedule a second PDSCH reception, or PUSCH transmission, on the first cell. The set of fields does not include the CIF when the second DCI format cannot schedule the second PDSCH reception, or PUSCH transmission, on the first cell.

20 Claims, 11 Drawing Sheets

(51) Int. Cl.
    *H04W 72/1263* (2023.01)
    *H04W 72/044* (2023.01)
    *H04W 72/23* (2023.01)

(56) References Cited

U.S. PATENT DOCUMENTS

| | | |
|---|---|---|
| 2019/0313385 A1 | 10/2019 | Yang et al. |
| 2020/0092073 A1 | 3/2020 | Papasakellariou et al. |
| 2021/0067268 A1 | 3/2021 | Seo et al. |
| 2022/0022234 A1* | 1/2022 | Khoshnevisan ...... H04L 5/0035 |

OTHER PUBLICATIONS

"5G; NR; Multiplexing and channel coding (3GPP TS 38.212 version 16.2.0 Release 16)", ETSI TS 138 212 V16.2.0, Jul. 2020, 154 pages.
"5G; NR; Physical layer procedures for control (3GPP TS 38.213 version 16.2.0 Release 16)", ETSI TS 138 213 V16.2.0, Jul. 2020, 180 pages.
"5G; NR; Physical layer procedures for data (3GPP TS 38.214 version 16.2.0 Release 16)", ETSI TS 138 214 V16.2.0, Jul. 2020, 167 pages.
"5G; NR; Medium Access Control (MAC) protocol specification (3GPP TS 38.321 version 16.1.0 Release 16)", ETSI TS 138 321 V16.1.0, Jul. 2020, 153 pages.
"5G; NR; Radio Resource Control (RRC); Protocol specification (3GPP TS 38.331 version 16.1.0 Release 16)", ETSI TS 138 331 V16.1.0, Jul. 2020, 886 pages.
International Search Report and Written Opinion of the International Searching Authority dated Dec. 24, 2021, in connection with International Application No. PCT/KR2021/012629, 6 pages.

* cited by examiner

ENHANCING SCHEDULING FLEXIBILITY FOR OPERATION WITH CARRIER AGGREGATION

CROSS-REFERENCE TO RELATED APPLICATION AND CLAIM OF PRIORITY

This application claims priority under 35 U.S.C. § 119(e) to U.S. Provisional Patent Application No. 63/078,489 filed on Sep. 15, 2020. The above-identified provisional patent applications are hereby incorporated by reference in its entirety.

TECHNICAL FIELD

The present disclosure relates generally to wireless communication systems and, more specifically, the present disclosure relates to enhancing scheduling flexibility for operation with carrier aggregation.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to enhancing scheduling flexibility for operation with carrier aggregation.

In one embodiment, a method for processing downlink control information (DCI) formats is provided. The method includes receiving a first physical downlink control channel (PDCCH) on a first cell that provides a first DCI format and determining a set of fields in the first DCI format. The first DCI format schedules a first physical downlink shared channel (PDSCH) reception, or a first physical uplink shared channel (PUSCH) transmission, only on the first cell. The set of fields includes a carrier indicator field (CIF) when a second DCI format provided by a second PDCCH reception on a second cell can schedule a second PDSCH reception, or a second PUSCH transmission, on the first cell. The set of fields does not include the CIF when the second DCI format provided by the second PDCCH reception on the second cell cannot schedule the second PDSCH reception, or the second PUSCH transmission, on the first cell.

In another embodiment, a user equipment (UE) is provided. The UE includes a transceiver configured to receive a first PDCCH on a first cell that provides a first DCI format and a processor operably connected to the transceiver. The processor is configured to determine a set of fields in the first DCI format. The first DCI format schedules a first PDSCH reception, or a first PUSCH transmission, only on the first cell. The set of fields includes a CIF when a second DCI format provided by a second PDCCH reception on a second cell can schedule a second PDSCH reception, or a second PUSCH transmission, on the first cell. the set of fields does not include the CIF when the second DCI format provided by the second PDCCH reception on the second cell cannot schedule the second PDSCH reception, or the second PUSCH transmission, on the first cell.

In yet another embodiment, a base station is provided. The base station includes a transceiver configured to transmit a first PDCCH on a first cell that provides a first DCI format and a processor operably connected to the transceiver. The processor configured to determine a set of fields in the first DCI format. The first DCI format schedules a first PDSCH transmission, or a first PUSCH reception, only on the first cell. The set of fields includes a CIF when a second DCI format provided by a second PDCCH transmission on a second cell can schedule a second PDSCH transmission, or a second PUSCH reception, on the first cell. The set of fields does not include the CIF when the second DCI format provided by the second PDCCH transmission on the second cell cannot schedule the second PDSCH transmission, or the second PUSCH reception, on the first cell.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
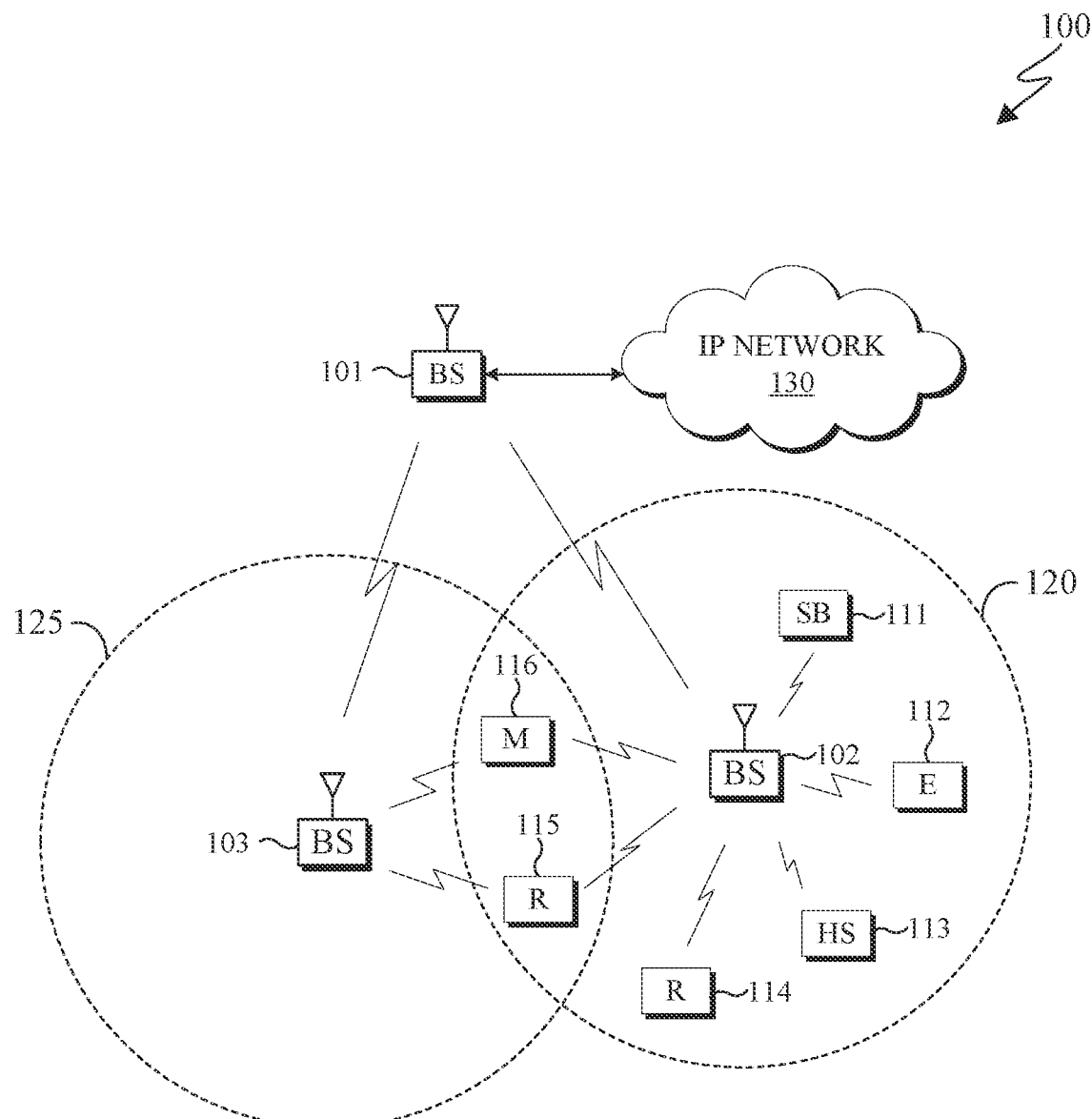
FIG. 1 illustrates an example wireless network according to embodiments of the present disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: 3GPP TS 38.211 v16.2.0, "NR; Physical channels and modulation;" 3GPP TS 38.212 v16.2.0, "NR; Multiplexing and Channel coding;" 3GPP TS 38.213 v16.2.0, "NR; Physical Layer Procedures for Control;" 3GPP TS 38.214 v16.2.0, "NR; Physical Layer Procedures for Data;" 3GPP TS 38.321 v16.1.0, "NR; Medium Access Control (MAC) protocol specification;" and 3GPP TS 38.331 v16.1.0, "NR; Radio Resource Control (RRC) Protocol Specification."

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' 'gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like.

Figure 2:
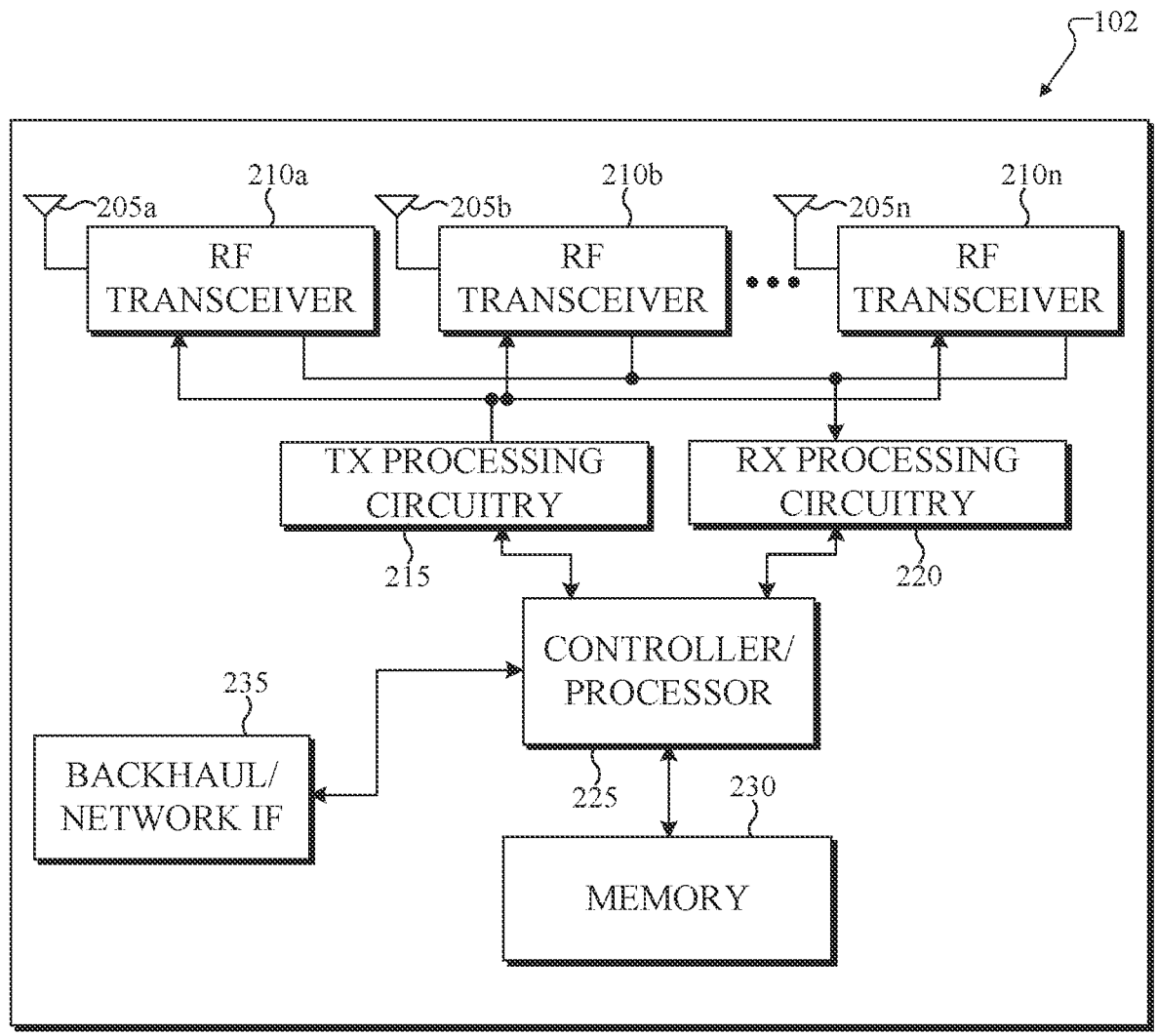
FIG. 2 illustrates an example base station (BS) according to embodiments of the present disclosure.
Figure 3:
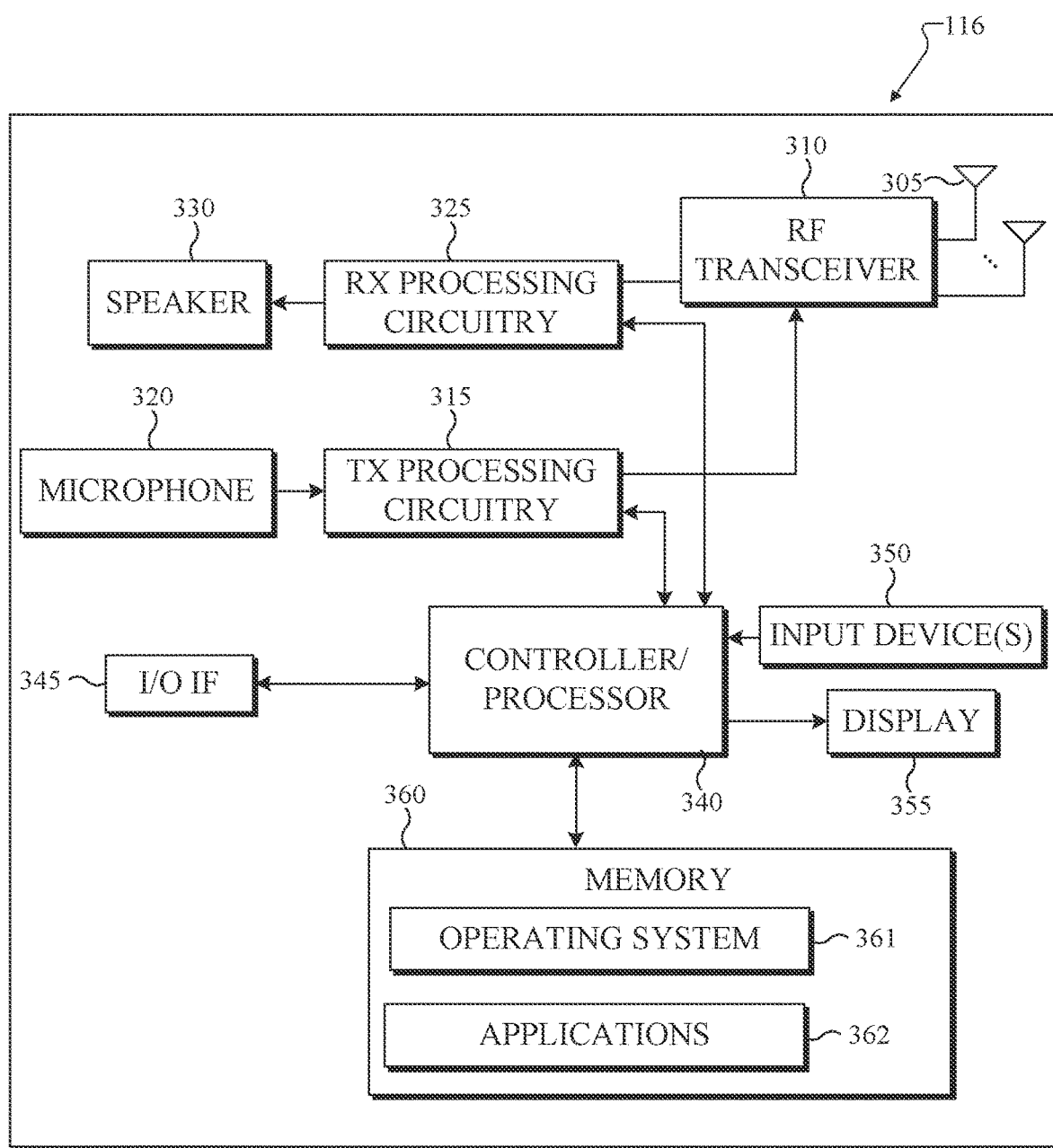
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station, BS 101 (e.g., gNB), a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 may communicate with each other and with the UEs 111-116 using 5G/NR, long term evolution (LTE), long term evolution-advanced (LTE-A), WiMAX, WiFi, or other wireless communication techniques.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of the UEs 111-116 include circuitry, programing, or a combination thereof for scheduling flexibility for operation with carrier aggregation. In certain embodiments, and one or more of the BSs 101-103 includes circuitry, programming, or a combination thereof for scheduling flexibility for operation with carrier aggregation.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of uplink channel signals and the transmission of downlink channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support scheduling flexibility for operation with carrier aggregation. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. In certain embodiments, the controller/processor 225 supports communication between entities, such as scheduling flexibility for operation with carrier aggregation. For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BSs over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of downlink channel signals and the transmission of uplink channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from BS s or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
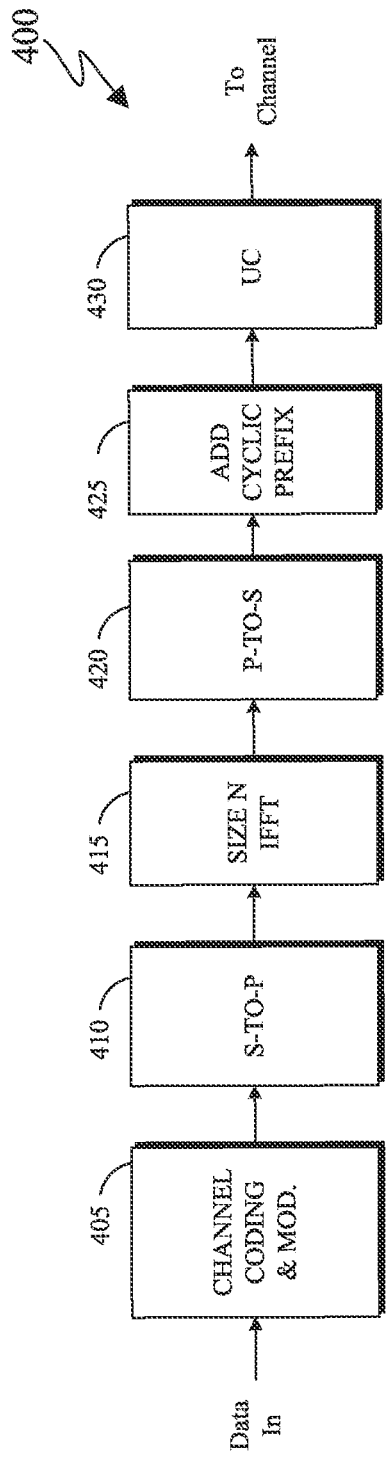
FIGS. 4 and 5 illustrate example wireless transmit and receive paths according to embodiments of the present disclosure.
Figure 5:
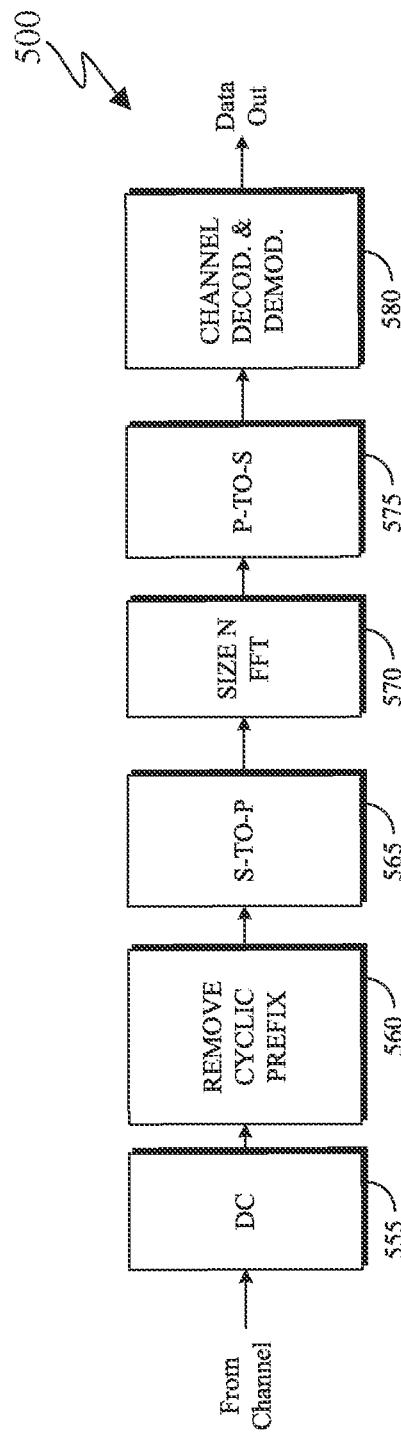

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A unit for downlink (DL) signaling or for uplink (UL) signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 kHz and include 12 SCs with inter-SC spacing of 15 kHz. A sub-carrier spacing (SCS) can be determined by a SCS configuration $\mu$ as $2^{\mu} \cdot 15$ kHz. A unit of one sub-carrier over one symbol is referred to as a resource element (RE). A unit of one RB over one symbol is referred to as a physical RB (PRB).

DL signals include data signals conveying information content, control signals conveying DL control information (DCI), reference signals (RS), and the like that are also known as pilot signals. A BS (such as the BS 102) transmits data information or DCI through respective physical DL shared channels (PDSCHs) or physical DL control channels (PDCCHs). A PDSCH or a PDCCH can be transmitted over a variable number of slot symbols including one slot symbol. A BS transmits one or more of multiple types of RS including channel state information RS (CSI-RS) and demodulation RS (DM-RS). A CSI-RS is intended for UEs (such as the UE 116) to perform measurements and provide channel state information (CSI) to a BS. For channel measurement or for time tracking, non-zero power CSI-RS (NZP CSI-RS) resources can be used. For interference measurement reports (IMRs), CSI interference measurement (CSI-IM) resources can be used. The CSI-IM resources can also be associated with a zero power CSI-RS (ZP CSI-RS) configuration. A UE can determine CSI-RS reception parameters through DL control signaling or higher layer signaling, such as radio resource control (RRC) signaling from a gNB. A DM-RS is typically transmitted only within a BW of a respective PDCCH or PDSCH and a UE can use the DM-RS to demodulate data or control information.

UL signals also include data signals conveying information content, control signals conveying UL control information (UCI), DM-RS associated with data or UCI demodulation, sounding RS (SRS) enabling a gNB to perform UL channel measurement, and a random access (RA) preamble enabling a UE (such as the UE 116) to perform random access. A UE transmits data information or UCI through a respective physical UL shared channel (PUSCH) or a physical UL control channel (PUCCH). A PUSCH or a PUCCH can be transmitted over a variable number of slot symbols including one slot symbol. When a UE simultaneously transmits data information and UCI, the UE can multiplex both in a PUSCH or, depending on a UE capability, transmit both a PUSCH with data information and a PUCCH with UCI at least when the transmissions are on different cells.

UCI includes hybrid automatic repeat request acknowledgement (HARQ-ACK) information, indicating correct or incorrect detection of data transport blocks (TBs) or of code block groups (CBGs) in a PDSCH, scheduling request (SR) indicating whether a UE has data in its buffer to transmit, and CSI reports enabling a gNB to select appropriate parameters for PDSCH or PDCCH transmissions to a UE. A CSI report can include a channel quality indicator (CQI) informing a gNB of a largest modulation and coding scheme (MCS) for the UE to detect a data TB with a predetermined block error rate (BLER), such as a 10% BLER, of a precoding matrix indicator (PMI) informing a gNB how to combine signals from multiple transmitter antennas in accordance with a multiple input multiple output (MIMO) transmission principle, of a CSI-RS resource indicator (CRI) used to obtain the CSI report, and of a rank indicator (RI) indicating a transmission rank for a PDSCH. In certain embodiments, UL RS includes DM-RS and SRS. DM-RS is typically transmitted within a BW of a respective PUSCH or PUCCH. A gNB can use a DM-RS to demodulate information in a respective PUSCH or PUCCH. SRS is transmitted by a UE to provide a gNB with an UL CSI and, for a time division duplexing (TDD) system, to also provide a PMI for DL transmission. Further, as part of a random access procedure or for other purposes, a UE can transmit a physical random access channel (PRACH).

DL transmissions and UL transmissions can be based on an orthogonal frequency division multiplexing (OFDM) waveform including a variant using DFT precoding that is known as DFT-spread-OFDM.

Figure 6:
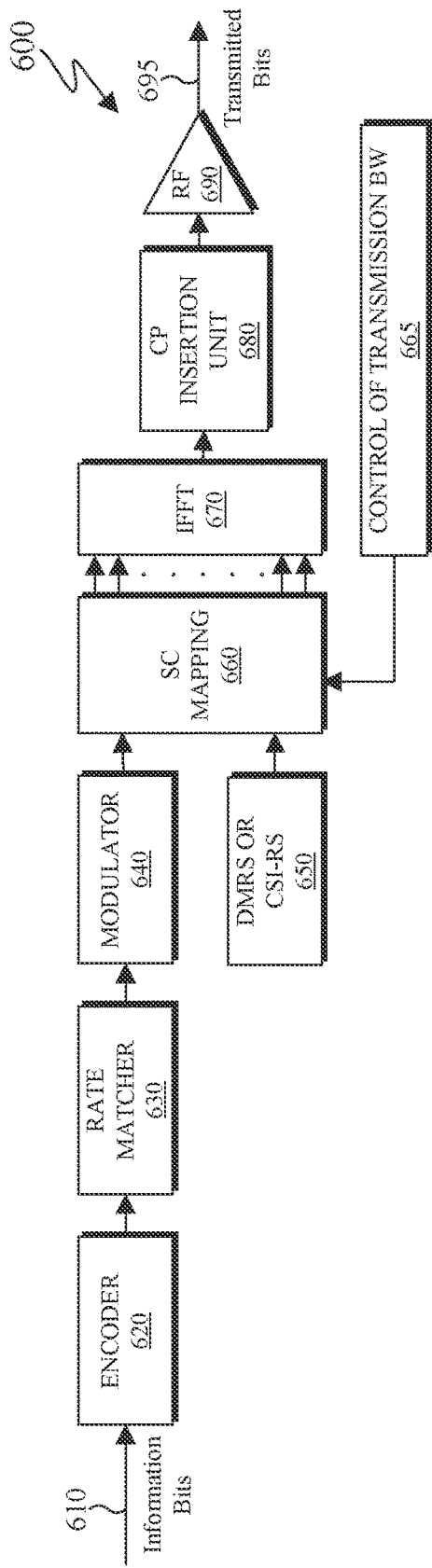
FIG. 6 illustrates a block diagram of an example transmitter structure using orthogonal frequency division multiplexing (OFDM) according to embodiments of the present disclosure.
Figure 7:
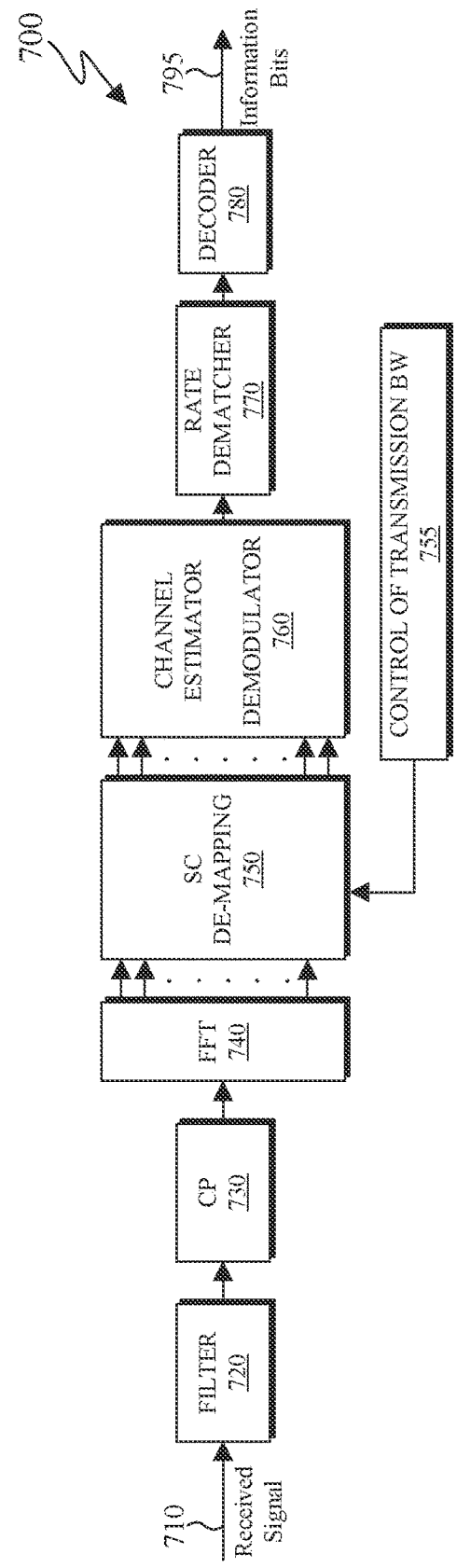
FIG. 7 illustrates a block diagram of an example receiver structure using OFDM according to embodiments of the present disclosure.

FIG. 6 illustrates a block diagram 600 of an example transmitter structure using orthogonal frequency division multiplexing (OFDM) according to embodiments of the present disclosure. FIG. 7 illustrates a block diagram 700 of an example receiver structure using OFDM according to embodiments of the present disclosure.

The transmitter structure as shown in the block diagram 600 and the receiver structure as shown in the block diagram 600 can be implanted in the RF transceivers 210a-210n of FIG. 2 and the RF transceiver 310 of FIG. 3. The example block diagram 600 of FIG. 6 and the block diagram 700 of FIG. 7 are for illustration only and other embodiments can be used without departing from the scope of the present disclosure.

As illustrated in the block diagram 600, information bits 610, such as DCI bits or data bits, are encoded by encoder 620, rate matched to assigned time/frequency resources by rate matcher 630 and modulated by modulator 640. Subsequently, modulated encoded symbols and DMRS or CSI-RS 650 are mapped to SCs by SC mapping unit 660 with input from BW selector unit 665, an inverse fast Fourier transform (IFFT) is performed by filter 670, a cyclic prefix (CP) is added by CP insertion unit 680, and a resulting signal is filtered by filter 690 and transmitted by a radio frequency (RF) unit as transmitted bits 695.

As illustrated in the block diagram 700, a received signal 710 is filtered by filter 720, a CP removal unit 730 removes a CP, a filter 740 applies a fast Fourier transform (FFT), SCs de-mapping unit 750 de-maps SCs selected by BW selector unit 755, received symbols are demodulated by a channel estimator and a demodulator unit 760, a rate de-matcher 770 restores a rate matching, and a decoder 780 decodes the resulting bits to provide information bits 790.

In certain embodiments, a UE monitors multiple candidate locations for respective potential PDCCH receptions to decode multiple DCI formats in a slot. A DCI format includes cyclic redundancy check (CRC) bits in order for the UE to confirm a correct detection of the DCI format. A type of a DCI format is identified by a radio network temporary identifier (RNTI) that scrambles the CRC bits of the DCI format.

For a DCI format scheduling a PDSCH or a PUSCH to a single UE, the RNTI can be a cell RNTI (C-RNTI), or a configured scheduling RNTI (CS-RNTI), or an MCS-C-RNTI and serves as a UE identifier. In the following examples, the C-RNTI will be referred to when needed. A UE typically receives/monitors PDCCH for detections of DCI formats with CRC scrambled by a C-RNTI according to a UE-specific search space (USS).

For a DCI format scheduling a PDSCH conveying system information (SI), the RNTI can be an SI-RNTI. For a DCI format scheduling a PDSCH providing a random access response (RAR), the RNTI can be an RA-RNTI. For a DCI format scheduling a PDSCH providing paging information, the RNTI can be a P-RNTI. There are also a number of other RNTIs that are provided to a UE by UE-specific RRC signaling and are associated with DCI formats providing various control information and are monitored according to a common search space (CSS).

Example, DCI formats include (i) a DCI format 2_0 providing a structure of a slot in term of DL, UL or flexible/reserved symbols over a number of slots, (ii) a DCI format 2_2 providing transmit power control (TPC) commands for PUSCH or PUCCH transmissions, (iii) a DCI format 2_3 providing TPC commands for SRS transmissions and also potentially triggering a SRS transmission on a number of cells, and the like, and a corresponding CSS is referred to as Type3-PDCCH CSS.

Figure 8:
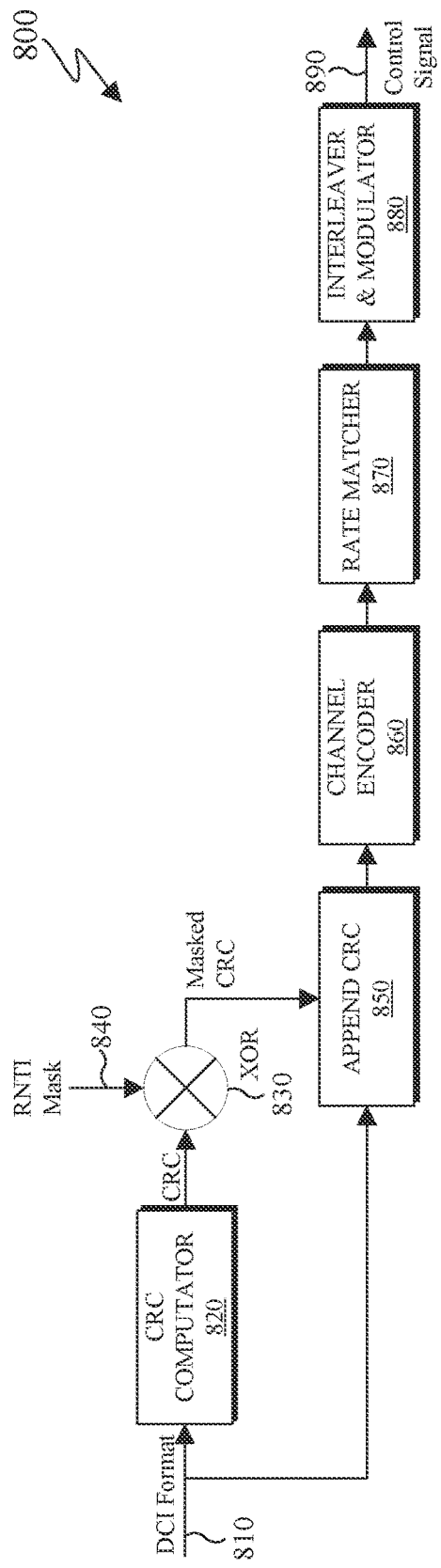
FIG. 8 illustrates an example encoding process for a downlink control information (DCI) format according to embodiments of the present disclosure.
Figure 9:
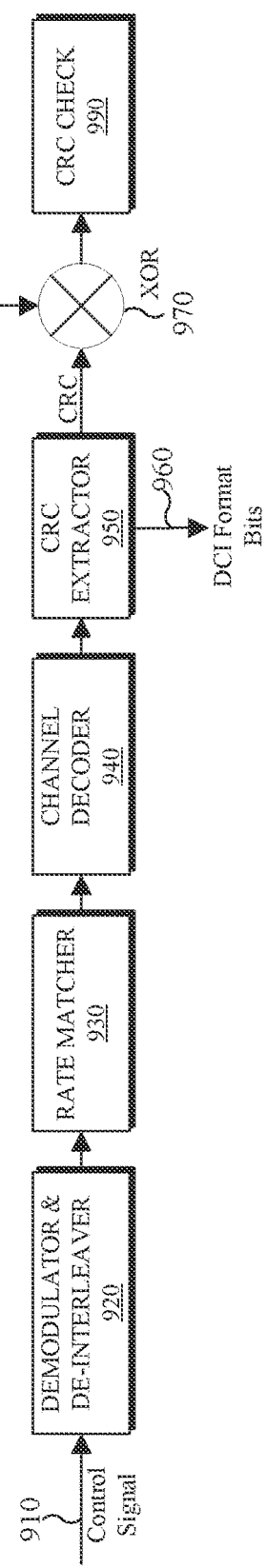
FIG. 9 illustrates an example decoding process for a DCI format for use with a UE according to embodiments of the present disclosure.

FIG. 8 illustrates an example encoding process 800 for a downlink control information (DCI) format according to embodiments of the present disclosure. FIG. 9 illustrates an example decoding process 900 for a DCI format for use with a UE according to embodiments of the present disclosure. The encoding process 800 of FIG. 8 and the decoding process 900 of FIG. 9 are for illustration only and other embodiments can be used without departing from the scope of the present disclosure.

A BS separately encodes and transmits each DCI format in a respective PDCCH. When applicable, a RNTI for a UE that a DCI format is intended for masks a CRC of the DCI format codeword in order to enable the UE to identify the DCI format. For example, the CRC can include 16 bits or 24 bits and the RNTI can include 16 bits or 24 bits. Otherwise, when a RNTI is not included in a DCI format, a DCI format type indicator field can be included in the DCI format.

As illustrated in FIG. 8, the CRC of (non-coded) DCI format bits 810 is determined using a CRC computation unit 820, and the CRC is masked using an exclusive OR (XOR) operation unit 830 between CRC bits and RNTI bits 840. The XOR operation is defined as XOR(0,0)=0, XOR(0,1)=1, XOR(1,0)=1, XOR(1,1)=0. The masked CRC bits are appended to DCI format information bits using a CRC append unit 850. An encoder 860 performs channel coding (such as tail-biting convolutional coding or polar coding), followed by rate matching to allocated resources by rate matcher 870. Interleaving and modulation units 880 apply interleaving and modulation, such as QPSK, and the output control signal 890 is transmitted.

As illustrated in FIG. 9, a received control signal 910 is demodulated and de-interleaved by a demodulator and a de-interleaver 920. A rate matching applied at a BS transmitter is restored by rate matcher 930, and resulting bits are decoded by decoder 940. After decoding, a CRC extractor 950 extracts CRC bits and provides DCI format information bits 960. The DCI format information bits are de-masked 970 by an XOR operation with a RNTI 980 (when applicable) and a CRC check is performed by unit 990. When the CRC check succeeds (check-sum is zero), the DCI format information bits are considered to be valid. When the CRC check does not succeed, the DCI format information bits are considered to be invalid.

In certain embodiments, a PDCCH transmission can be within a set of PRBs. A BS can configure a UE with one or more sets of PRB sets, also referred to as control resource sets (CORESETs), for PDCCH receptions. A PDCCH reception can be in control channel elements (CCEs) that are included in a CORESET.

A UE can monitor PDCCH according to a first PDCCH monitoring type or according to a second PDCCH monitoring type. For the first PDCCH monitoring type that corresponds to a UE capability for PDCCH monitoring per slot, a maximum number of PDCCH candidates $M_{PDCCH}^{max,slot,\mu}$ and a maximum number of non-overlapping CCEs $C_{PDCCH}^{max,slot,\mu}$ for the reception of PDCCH candidates is defined per slot. Non-overlapping CCEs are CCEs with different indexes or in different symbols of a CORESET or in different CORESETs.

In certain embodiments, if a UE (such as the UE 116) can support a first set of $N_{cells,0}^{DL}$ serving cells and a second set of $N_{cells,1}^{DL}$ serving cells, then the UE determines, for the purpose of reporting pdcch-BlindDetectionCA, a number of serving cells as $N_{cells,0}^{DL}+R \cdot N_{cells,1}^{DL}$ where R is a value reported by the UE. In this embodiment, (i) first set of $N_{cells,0}^{DL}$ serving cells where the UE is either not provided CORESETPoolIndex or is provided CORESETPoolIndex with a single value for all CORESETs on all DL bandwidth parts (BWPs) of each serving cell from the first set of serving cells and (ii) the second set of $N_{cells,1}^{DL}$ serving cells is associated where the UE is provided CORESETPoolIndex with a value 0 for a first CORESET and with a value 1 for a second CORESET on any DL BWP of each serving cell from the second set of serving cells.

In certain embodiments, if a UE (such as the UE 116) is (i) is configured with $N_{cells,0}^{DL,\mu}+N_{cells,1}^{DL,\mu}$ downlink cells, (ii) associated PDCCH candidates monitored in the active DL BWPs of the scheduling cell(s) using SCS configuration $\mu$, where $\Sigma_{\mu=0}^{3}(N_{cells,0}^{DL,\mu}+\gamma \cdot N_{cells,1}^{DL,\mu})>N_{cells}^{cap}$, and (iii) a DL BWP of an activated cell is the active DL BWP of the activated cell, and a DL BWP of a deactivated cell is the DL BWP with index provided by firstActiveDownlinkBWP-Id for the deactivated cell, then the UE is not required to monitor more than $M_{PDCCH}^{total,slot,\mu}=\lfloor N_{cells}^{cap} \cdot M_{PDCCH}^{max,slot,\mu} \cdot (N_{cells,0}^{DL,\mu}+\gamma \cdot N_{cells,1}^{DL,\mu})/\Sigma_{j=0}^{3}(N_{cells,0}^{DL,j}+\gamma \cdot N_{cells,1}^{DL,j}) \rfloor$ PDCCH candidates or more than $C_{PDCCH}^{total,slot,\mu}=\lfloor N_{cells}^{cap} \cdot C_{PDCCH}^{max,slot,\mu} \cdot (N_{cells,0}^{DL,\mu}+\gamma \cdot N_{cells,1}^{DL,\mu})/\Sigma_{j=0}^{3}(N_{cells,0}^{DL,j}+\gamma \cdot N_{cells,1}^{DL,j}) \rfloor$ non-overlapped CCEs per slot on the active DL BWP(s) of scheduling cell(s) from the $N_{cells,0}^{DL,\mu}+N_{cells,1}^{DL,\mu}$ downlink cells. In this example, $N_{cells}^{cap}$ is equal to 4 or is a capability reported by the UE. Additionally, in this example, $\gamma$ is a value that is provided by higher layers to the UE or is R.

For each scheduled cell, the UE is not required to monitor on the active DL BWP with SCS configuration $\mu$ of the scheduling cell from the $N_{cells,1}^{DL,\mu}$ downlink cells more than $\min(M_{PDCCH}^{max,slot,\mu}, M_{PDCCH}^{total,slot,\mu})$ PDCCH candidates or more than $\min(C_{PDCCH}^{max,slot,\mu}, C_{PDCCH}^{total,slot,\mu})$ non-overlapped CCEs per slot.

Similar, for each scheduled cell, the UE is not required to monitor on the active DL BWP with SCS configuration $\mu$ of the scheduling cell from the $N_{cells,1}^{DL,\mu}$ downlink cells more than $\min(\gamma \ M_{PDCCH}^{max,slot,\mu}, M_{PDCCH}^{total,slot,\mu})$ PDCCH candidates or more than $\min(\gamma \ C_{PDCCH}^{max,slot,\mu}, C_{PDCCH}^{total,slot,\mu})$ non-overlapped CCEs per slot. Additionally, for each scheduled cell, the UE is not required to monitor on the active DL BWP with SCS configuration $\mu$ of the scheduling cell from the $N_{cells,1}^{DL,\mu}$ downlink cells more than $\min(M_{PDCCH}^{max,slot,\mu}, M_{PDCCH}^{total,slot,\mu})$ PDCCH candidates or more than $\min(C_{PDCCH}^{max,slot,\mu}, C_{PDCCH}^{total,slot,\mu})$ non-overlapped CCEs per slot for CORESETs with same CORESETPoolIndex value. If a CORESETPoolIndex is not provided for a cell or if a single CORESETPoolIndex is provided for a cell, then $\gamma=0$.

In certain embodiments, a UE determines CCEs for decoding a PDCCH candidate based on a search space. For some RNTIs, such as a C-RNTI, a set of PDCCH candidates for respective DCI formats define corresponding UE-specific search space sets. For other RNTIs, such as a SI-RNTI, a set of PDCCH candidates for respective DCI formats define corresponding common search space sets (CSS sets). A search space set is associated with a CORESET where the UE monitors PDCCH candidates for the search space set. A UE expects to monitor PDCCH candidates for up to 4 sizes of DCI formats that include up to 3 sizes of DCI formats with CRC scrambled by C-RNTI or MCS-C-RNTI per serving cell. The UE can count a number of sizes for DCI formats per serving cell based on a number of configured PDCCH candidates in respective search space sets for the corresponding active DL BWP.

In certain embodiments, for cross-carrier scheduling, the number of PDCCH candidates for monitoring and the number of non-overlapped CCEs per span or per slot are separately counted for each scheduled cell.

For a search space set s associated with CORESET p, the CCE indexes for aggregation level L corresponding to PDCCH candidate $m_{s,n_{CI}}$ of the search space set in slot $n_{s,f}^{\mu}$ for an active DL BWP of a serving cell corresponding to carrier indicator field value $n_{CI}$ are given by Equation (1), below. As described in Equation (1), for any CSS, $Y_{p,n_{s,f}}^{\mu}=0$. Similar, for a USS, $Y_{p,n_{s,f}}^{\mu}=(A_{p} \cdot Y_{p,n_{s,f}^{\mu}-1}) \bmod D$, $Y_{p,-1}=n_{RNTI} \neq 0$, $A_{p}=39827$ for p mod 3=0, $A_{p}=39829$ for p mod 3=1, $A_{p}=39839$ for p mod 3=2, and D=65537. Additionally, as described in Equation (1), i=0, . . . , L−1, and $N_{CCE,p}$ is a number of CCEs, numbered from 0 to $N_{CCE,p}-1$, in CORESET p. Similar, $n_{CI}$ is a carrier indicator field value if the UE is configured with a carrier indicator field for the serving cell on which PDCCH is monitored; otherwise, including for any CSS, $n_{CI}=0$. The expression $m_{s,n_{CI}}$ as described in Equation (1), illustrates that $m_{s,n_{CI}}=0$, . . . $M_{s,n_{CI}}^{(L)}-1$, where $M_{s,n_{CI}}^{(L)}$ is the number of PDCCH candidates the UE is configured to monitor for aggregation level L of a search space set s for a serving cell corresponding to $n_{CI}$. For a USS, $M_{s,max}^{(L)}$ is the maximum of $M_{s,n_{CI}}^{(L)}$ over all configured $n_{CI}$ values for a CCE aggregation level L of search space set s. Further, the RNTI value used for $n_{RNTI}$ is the C-RNTI.

$$L \cdot \left\{ \left( Y_{p,n_{s,f}}^{\mu} + \left\lfloor \frac{m_{s,n_{CI}} \cdot N_{CCE,p}}{L \cdot M_{S,max}^{(L)}} \right\rfloor + n_{CI} \right) \bmod \lfloor N_{CCE,p}/L \rfloor \right\} + i \quad (1)$$

In certain embodiments, a UE (such as the UE 116) monitors PDCCH according to a CSS set for scheduling a PDSCH providing system information, random access response, or paging only on one cell that is referred to as primary cell. The UE transmits PUCCH only on the primary cell. In certain embodiments, the UE is configured as a primary secondary cell (PSCell) for PUCCH transmissions. When the UE is configured as a PSCell, the UE transmits PUCCH on the primary cell for a master/primary cell group and transmits PUCCH on the PSCell for a secondary cell group. For brevity, the embodiments descriptions of this disclosure considers the primary cell, but the embodiments can be directly extended to a PSCell.

For all search space sets within a slot n or within a span in slot n, denote by $S_{css}$, a set of CSS sets with cardinality of $I_{css}$ and by $S_{uss}$ a set of USS sets with cardinality of $J_{ess}$. The location of USS sets $s_j$, $0 \le j < J_{uss}$, in $S_{uss}$ is according to an ascending order of the search space set index.

Denote by $M_{S_{css}(i)}^L$, $0 \le i < I_{css}$, the number of counted PDCCH candidates for monitoring for CSS set $S_{css}(i)$ and by $M_{S_{uss}(j)}^{(L)}$, $0 \le j < J_{uss}$, the number of counted PDCCH candidates for monitoring for USS set $S_{uss}(j)$. For the CSS sets, a UE monitors $M_{PDCCH}^{CSS} = \Sigma_{i=0}^{I_{css}-1} \Sigma_L M_{S_{css}(i)}^{(L)}$ PDCCH candidates requiring a total of $C_{PDCCH}^{CSS}$ non-overlapping CCEs in a slot or in a span.

In certain embodiments the UE (such as the UE 116) allocates PDCCH candidates for monitoring to USS sets for the primary cell having an active DL BWP with SCS configuration μ in a slot according to Syntax (1), below. If for the USS sets for scheduling on the primary cell the UE is not provided CORESETPoolIndex for first CORESETs or is provided CORESETPoolIndex with value 0 for first CORESETs, and is provided CORESETPoolIndex with value 1 for second CORESETs, and if min $(\gamma \cdot M_{PDCCH}^{max,slot,\mu}, M_{PDCCH}^{total,slot,\mu}) > $ min $(M_{PDCCH}^{max,slot,\mu}, M_{PDCCH}^{total,slot,\mu})$ or min $(\gamma \cdot C_{PDCCH}^{max,slot,\mu}, C_{PDCCH}^{total,slot,\mu}) > $ min $(C_{PDCCH}^{max,slot,\mu}, C_{PDCCH}^{total,slot,\mu})$. It is noted that Syntax (1) applies to USS sets associated with the first CORESETs. A UE does not expect to monitor PDCCH in a USS set without allocated PDCCH candidates for monitoring.

Denote by $V_{CCE}(S_{uss}(j))$ the set of non-overlapping CCEs for search space set $S_{uss}(j)$ and by $C(V_{CCE}(S_{uss}(j)))$ the cardinality of $V_{CCE}(S_{uss}(j))$ where the non-overlapping CCEs for search space set $S_{uss}(j)$ are determined considering the allocated PDCCH candidates for monitoring for the CSS sets and the allocated PDCCH candidates for monitoring for all search space sets $S_{uss}(k)$, $0 \le k \le j$.

---

Syntax (1)
Set $M_{PDCCH}^{uss} = \min(M_{PDCCH}^{max,slot,\mu}, M_{PDCCH}^{total,slot,\mu}) - M_{PDCCH}^{css}$
Set $C_{PDCCH}^{uss} = \min(C_{PDCCH}^{max,slot,\mu}, C_{PDCCH}^{total,slot,\mu}) - C_{PDCCH}^{css}$
Set j = 0
while $\Sigma_L M_{S_{uss}(j)}^{(L)} \le M_{PDCCH}^{uss}$ AND $C(V_{CCE}(S_{uss}(j))) \le C_{PDCCH}^{uss}$
   allocate $\Sigma_L M_{S_{uss}(j)}^{(L)}$ PDCCH candidates for monitoring to USS set $S_{uss}(j)$
   $M_{PDCCH}^{uss} = M_{PDCCH}^{uss} - \Sigma_L M_{S_{uss}(j)}^{(L)}$;
   $C_{PDCCH}^{uss} = C_{PDCCH}^{uss} - C(V_{CCE}(S_{uss}(j)))$;
   j = j + 1;
end while

---

In certain embodiments, a UE (such as the UE 116) that is configured with discontinuous reception (DRX) mode operation, can be configured to monitor PDCCH on a primary cell outside Active Time for detection of a DCI format, referred to as DCI format 2_6, and a location of a Wake-up indication bit in DCI format 2_6. A '0' value for the Wake-up indication bit, when reported to higher layers, indicates to not start the drx-onDurationTimer for the next long DRX cycle. A '1' value for the Wake-up indication bit, when reported to higher layers, indicates to start the drx-onDurationTimer for the next long DRX cycle. When the UE is configured search space sets to monitor PDCCH for detection of a DCI format 2_6 and the UE fails to detect the DCI format 2_6, the UE behavior for whether or not the UE starts the drx-onDurationTimer for the next DRX cycle on the primary cell can be configured by higher layers (to start the drx-onDurationTimer or to not start the drx-onDurationTimer). The drx-onDurationTimer is the duration at the beginning of a DRX cycle.

In certain embodiments, the UE can also be configured in DCI format 2_6 a bitmap for corresponding groups of configured secondary cells (SCells). It is noted that a '0' value for a bit of the bitmap indicates an active DL BWP that is a dormant BWP for the UE for each activated SCell in the corresponding group of configured SCells. Similarly, a '1' value for a bit of the bitmap indicates an active (non-dormant) DL BWP for the UE for each activated SCell in the corresponding group of configured SCells. if a current active DL BWP is the dormant DL BWP, or a current active DL BWP for the UE for each activated SCell in the corresponding group of configured SCells if the current active DL BWP is not the dormant DL BWP. The UE does not monitor PDCCH in the dormant BWP of an SCell. When a UE detects DCI format 2_6, the physical layer of a UE reports the value of the Wake-up indication bit for the UE to higher layers for the next long DRX cycle; otherwise, it does not. The UE can also be indicated to change an active DL BWP to a dormant BWP or to a non-dormant BWP by a DCI format scheduling PDSCH reception on the primary cell. An active DL BWP of a UE on a primary cell is not indicated to change to a dormant BWP.

In certain embodiments, an ability of a gNB (such as the BS 102) to schedule a UE (such as the UE 116) on a cell depends on a maximum PDCCH monitoring capability of the UE for scheduling on the cell as defined by min $(M_{PDCCH}^{max,slot,\mu}, M_{PDCCH}^{total,slot,\mu})$ PDCCH candidates and min $(C_{PDCCH}^{max,slot,\mu}, C_{PDCCH}^{total,slot,\mu})$ non-overlapped CCEs per slot for a scheduling cell from the $N_{cells,0}^{DL,\mu}$ downlink cells or by min $(\gamma \cdot M_{PDCCH}^{max,slot,\mu}, M_{PDCCH}^{total,slot,\mu})$ PDCCH candidates and min $(\gamma \cdot C_{PDCCH}^{max,slot,\mu}, C_{PDCCH}^{total,slot,\mu})$ for a scheduling cell from the $N_{cells,1}^{DL,\mu}$ downlink cells. While $M_{PDCCH}^{max,slot,\mu}$ and $C_{PDCCH}^{max,slot,\mu}$ are predetermined numbers for a SCS configuration μ, $M_{PDCCH}^{total,slot,\mu}$ and $C_{PDCCH}^{total,slot,\mu}$ are variable and depend on a total number of cells for SCS configuration μ, $N_{cells,0}^{DL,\mu} + \gamma \cdot N_{cells,1}^{DL,\mu}$, and on a total number of cells across all SCS configurations $\Sigma_{j=0}^{3} (N_{cells,0}^{DL,j} + \gamma \cdot N_{cells,1}^{DL,j})$. Determining $M_{PDCCH}^{total,slot,\mu}$ and $C_{PDCCH}^{total,slot,\mu}$ based on a number of configured cells results to an under-dimensioning of the PDCCH monitoring capability of the UE as, at a given time, the UE can deterministically know that it cannot be scheduled in certain cells and therefore a corresponding PDCCH monitoring capability can be reallocated to other cells where scheduling can occur.

At least for initial deployments, UEs using new radio (NR) radio access technology (NR UEs) coexist with legacy UEs using long-term evolution (LTE) radio access technology (LTE UEs) in a same network. To enable such coexistence in a same spectrum, dynamic spectrum sharing (DSS) is used where NR UEs and LTE UEs share a same channel and a network can dynamically allocate resources among LTE UEs and NR UEs. During certain time instances (slots for NR or subframes for LTE), a network may allocate most of the DL resources to LTE UEs while typically UL spectrum is not fully utilized and can be used for transmission from either NR UEs or LTE UEs. It is also possible that some DL spectrum can be available for PDSCH receptions by NR UEs. To enable such operation for NR UEs capable of carrier aggregation (CA) operation, the PDCCH receptions scheduling the PDSCH receptions on the first cell where LTE UEs and NR UEs coexist can be offloaded to a second cell where, for example, only NR UEs exist. As the first cell is typically a macro-cell providing synchronization signals and broadcast system information, it is a primary cell and the second cell is a secondary cell. However, DSS operation can also be applicable among secondary cells. In general, with DSS, an NR UE can be scheduled PDSCH receptions or PUSCH transmissions on a first cell either from the first cell, such as a primary cell, or from a second cell such as an SCell.

For operation with carrier aggregation, a cell can be a scheduling cell either only for itself or also for additional cells. In the former case, a DCI format scheduling PDSCH receptions or PUSCH transmissions on the cell does not include a carrier indicator field (CIF) to indicate a scheduled cell. In the latter case, the DCI format includes the CIF.

In the remaining of this disclosure, unless otherwise explicitly mentioned, the term UE refers to an NR UE. The SCell (where a UE can receive PDCCHs providing DCI formats scheduling receptions or transmissions on the primary cell, or providing information for receptions or transmissions on the primary cell) is referred to as auxiliary SCell.

Scheduling a UE on a first cell, such as a primary cell, from either the first cell or from a second cell, such as a secondary cell (SCell) or auxiliary SCell, creates additional requirements for PDCCH monitoring on both the primary cell and on the auxiliary SCell. One such requirement is to maintain up to 3 sizes of DCI formats with CRC scrambled by C-RNTI per serving cell for the first cell. Another requirement, when the UE is configured by UE-specific RRC signaling to monitor PDCCH for detection of DCI formats according to a CSS, referred to as Type3-PDCCH CSS, on the auxiliary SCell, relates to treating the auxiliary SCell as the primary cell with respect to overbooking the PDCCH capability of the UE on the auxiliary SCell and the UE performing search space set dropping by prioritizing search space sets corresponding to PDCCH monitoring according to CSS.

Therefore, embodiments of the present disclosure take into consideration that there is a need to adapt a total number of PDCCH candidates and a total number of non-overlapped CCEs that a UE can monitor per slot according to a number of cells where the UE can be scheduled in the slot.

Embodiments of the present disclosure also take into consideration that there is a need to define a procedure for a UE to maintain a same number of sizes for a DCI format with CRC scrambled by a C-RNTI that the UE needs to monitor PDCCH for scheduling on a first cell when the UE can be scheduled on the first cell either by a PDCCH reception on the first cell or by a PDCCH reception on a second cell.

Embodiments of the present disclosure further take into consideration that there is a need to determine a procedure for a UE to apply a search space set dropping procedure on a primary cell or on a secondary cell depending on configuration of search space sets for PDCCH monitoring.

Accordingly, embodiments of the present disclosure relate to adapting a total number of PDCCH candidates and a total number of non-overlapped CCEs that a UE can monitor per slot according to a number of cells where the UE can be scheduled in the slot. The present disclosure also relates to defining a procedure for a UE to maintain a same number of sizes for a DCI format with CRC scrambled by a C-RNTI that the UE needs to monitor PDCCH for scheduling on a first cell when the UE can be scheduled on the first cell either by a PDCCH reception on the first cell or by a PDCCH reception on a second cell. The present disclosure further relates to determining a procedure for a UE to apply a search space set dropping procedure on a primary cell or on a secondary cell depending on configuration of search space sets for PDCCH monitoring.

Embodiments of the present disclosure describe adapting a total number of PDCCH candidates or a total number of non-overlapped CCEs. The following examples and embodiments describe adapting a total number of PDCCH candidates or a total number of non-overlapped CCEs based on a number of schedulable cells per slot.

Embodiments of the present disclosure consider an adaptation of a total number of PDCCH candidates or a total number of non-overlapped CCEs based on a number of schedulable cells per slot.

In certain embodiments, the schedulable cells per slot can be determined based on TDD UL-DL configurations for respective scheduling cells. In this embodiment a TDD UL-DL configuration for a scheduling cell is provided by a system information block (SIB) and can subsequently also be adjusted by UE-specific RRC signaling.

For example, when a UE is configured with $N_{cells}^{DL,\mu}$ cells then, for a slot that includes only UL symbols for scheduling cells of $N_{cells}^{DL,\mu}$ scheduled cells, the UE knows based on the TDD UL-DL configurations that the UE cannot receive PDCCH for scheduling on the $N_{cells,X}^{DL,\mu}$ scheduled cells. If $N_{cells,0,X}^{DL,\mu}$ scheduled cells of the $N_{cells,X}^{DL,\mu}$ scheduled cells belong to the $N_{cells,0}^{DL,\mu}$ cells and $N_{cells,1,X}^{DL,\mu}$ scheduled cells of the $N_{cells,X}^{DL,\mu}$ scheduled cells belong to the $N_{cells,1}^{DL,\mu}$ cells, then the UE is not required to monitor more than either Equation (2) or Equation (3).

$$M_{PDCCH}^{total,slot,\mu} = \left\lfloor N_{cells}^{cap} \cdot M_{PDCCH}^{max,slot,\mu} \cdot \frac{\left((N_{cells,0}^{DL,\mu} - N_{cells,0,X}^{DL,\mu}) + \gamma \cdot (N_{cells,1}^{DL,\mu} - N_{cells,1,X}^{DL,\mu})\right)}{\sum_{j=0}^{3}\left((N_{cells,0}^{DL,\mu} - N_{cells,0,X}^{DL,\mu}) + \gamma \cdot (N_{cells,1}^{DL,\mu} - N_{cells,1,X}^{DL,\mu})\right)} \right\rfloor \quad (2)$$

PDCCH candidates $$C_{PDCCH}^{total,slot,\mu} = \left\lfloor N_{cells}^{cap} \cdot C_{PDCCH}^{max,slot,\mu} \cdot \frac{\left((N_{cells,0}^{DL,\mu} - N_{cells,0,X}^{DL,\mu}) + \gamma \cdot (N_{cells,1}^{DL,\mu} - N_{cells,1,X}^{DL,\mu})\right)}{\sum_{j=0}^{3}\left((N_{cells,0}^{DL,\mu} - N_{cells,0,X}^{DL,\mu}) + \gamma \cdot (N_{cells,1}^{DL,\mu} - N_{cells,1,X}^{DL,\mu})\right)} \right\rfloor \quad (3)$$

non-overlapped CCEs

Here, Equations (2) and (3) are per slot on the active DL BWP(s) of scheduling cell(s) from the $N_{cells,0}^{DL,\mu} + N_{cells,1}^{DL,\mu}$ cells.

In certain embodiments, by excluding cells that cannot be scheduled in a slot from a determination of a total number of PDCCH candidates or of non-overlapped CCEs that a UE can monitor per slot (instead of having such determination be independent of whether or not there can be PDCCH transmissions on a scheduling cell in a slot), increases the PDCCH monitoring capability for a UE in applicable slots. An increase of the PDCCH monitoring capability for a UE can improve a gNB scheduling flexibility as the gNB can use a larger number of PDCCH candidates to schedule the UE. By using a larger number of PDCCH candidates to schedule the UE (i) reduces a probability for PDCCH blocking, improve a throughput for a UE as the UE can be more frequently scheduled and reduces a probability for search space set dropping due to a reduced probability that $M_{PDCCH}^{total,slot,\mu}$ is smaller than $M_{PDCCH}^{max,slot,\mu}$ or that $C_{PDCCH}^{total,slot,\mu}$ is smaller than $C_{PDCCH}^{max,slot,\mu}$.

A first approach for a network to utilize an increased PDCCH monitoring capability for scheduled cells in a slot is for a gNB to configure a UE with search space sets for a scheduled cell that result to a larger number of PDCCH candidates or non-overlapped CCEs for monitoring PDCCH for the scheduled cells in slots where the UE does not monitor PDCCH for other scheduled cells.

A second approach for a gNB to utilize an increased PDCCH monitoring capability of a UE for scheduled cells in a slot is for the gNB to configure a UE with two sets of search space sets wherein the first set is applicable when $M_{PDCCH}^{total,slot,\mu} \leq M_{PDCCH,threshold}^{total,slot,\mu}$ or $C_{PDCCH}^{total,slot,\mu} \leq C_{PDCCH,threshold}^{total,slot,\mu}$ and the second set is applicable when $M_{PDCCH}^{total,slot,\mu} > M_{PDCCH,threshold}^{total,slot,\mu}$ and $C_{PDCCH}^{total,slot,\mu} > C_{PDCCH,threshold}^{total,slot,\mu}$ wherein $M_{PDCCH,threshold}^{total,slot,\mu}$ and $C_{PDCCH,threshold}^{total,slot,\mu}$ can be provided to the UE by higher layers, for example as part of the configuration of the two sets of search space sets, or can be derived by the UE, or can be predetermined in the system operation. For example, higher layers can indicate $M_{PDCCH,threshold}^{total,slot,\mu}$ and $C_{PDCCH,threshold}^{total,slot,\mu}$ as a fraction of $N_{cells}^{cap} \cdot M_{PDCCH}^{max,slot,\mu}$ and $N_{cells}^{cap} \cdot C_{PDCCH}^{max,slot,\mu}$. For example, higher layers can indicate $M_{PDCCH,threshold}^{total,slot,\mu}$ and $C_{PDCCH,threshold}^{total,slot,\mu}$ as a fraction of Equation (4) or Equation (5), below. For example, $M_{PDCCH,threshold}^{total,slot,\mu}$ and $C_{PDCCH,threshold}^{total,slot,\mu}$ can be defined in the system operation to be a predetermined fraction of cap $N_{cells}^{cap} \cdot M_{PDCCH}^{max,slot,\mu}$ and $N_{cells}^{cap} \cdot C_{PDCCH}^{max,slot,\mu}$.

$$M_{PDCCH}^{max,slot,\mu} \cdot \frac{\left(\left(N_{cells,0}^{DL,\mu} - N_{cell,0,X}^{DL,\mu}\right) + \gamma \cdot \left(N_{cells,1}^{DL,\mu} - N_{cells,1,X}^{DL,\mu}\right)\right)}{\sum_{j=0}^{3}\left(\left(N_{cells,0}^{DL,\mu} - N_{cells,0,X}^{DL,\mu}\right) + \gamma \cdot \left(N_{cells,1}^{DL,\mu} - N_{cells,1,X}^{DL,\mu}\right)\right)} \quad (4)$$

$$C_{PDCCH}^{max,slot,\mu} \cdot \frac{\left(\left(N_{cells,0}^{DL,\mu} - N_{cell,0,X}^{DL,\mu}\right) + \gamma \cdot \left(N_{cells,1}^{DL,\mu} - N_{cells,1,X}^{DL,\mu}\right)\right)}{\sum_{j=0}^{3}\left(\left(N_{cells,0}^{DL,\mu} - N_{cells,0,X}^{DL,\mu}\right) + \gamma \cdot \left(N_{cells,1}^{DL,\mu} - N_{cells,1,X}^{DL,\mu}\right)\right)} \quad (5)$$

A third approach for a network to utilize an increased PDCCH monitoring capability for scheduled cells in a slot is by reducing a probability for search space set dropping in a given slot. This is because a determination for (UE-specific) search space set dropping does not depend only on a possibly time varying number of search space sets that a UE is configured to monitor PDCCH in a slot but also depends on $M_{PDCCH}^{total,slot,\mu}$ and $C_{PDCCH}^{total,slot,\mu}$. Depending on a number of scheduling cells where the UE does not need to monitor PDCCH in the slot, $M_{PDCCH}^{total,slot,\mu}$ and $C_{PDCCH}^{total,slot,\mu}$ can have values that vary across slots and are not always the minimum ones that correspond to the case that the UE needs to monitor PDCCH on all scheduling cells.

If a UE is not provided an UL-DL configuration for a scheduling cell, such as when the scheduling cell operates with FDD, the scheduled cells associated with the scheduling cell are not included in $N_{cells,0,X}^{DL,\mu}$ or in $N_{cells,1,X}^{DL,\mu}$. Also, an adjustment for $M^{total,slot,\mu}$ and $C_{PDCCH}^{total,slot,\mu}$ in a slot based on a configuration on a scheduling that determines whether or not a UE needs to monitor PDCCH on the scheduling cell in the slot can extend to any applicable configuration, such as for example based on a configuration indicating whether or not the UE needs to receive on the scheduling cell in the slot as part of an intercell interference coordination (ICIC) mechanism.

Figure 10:
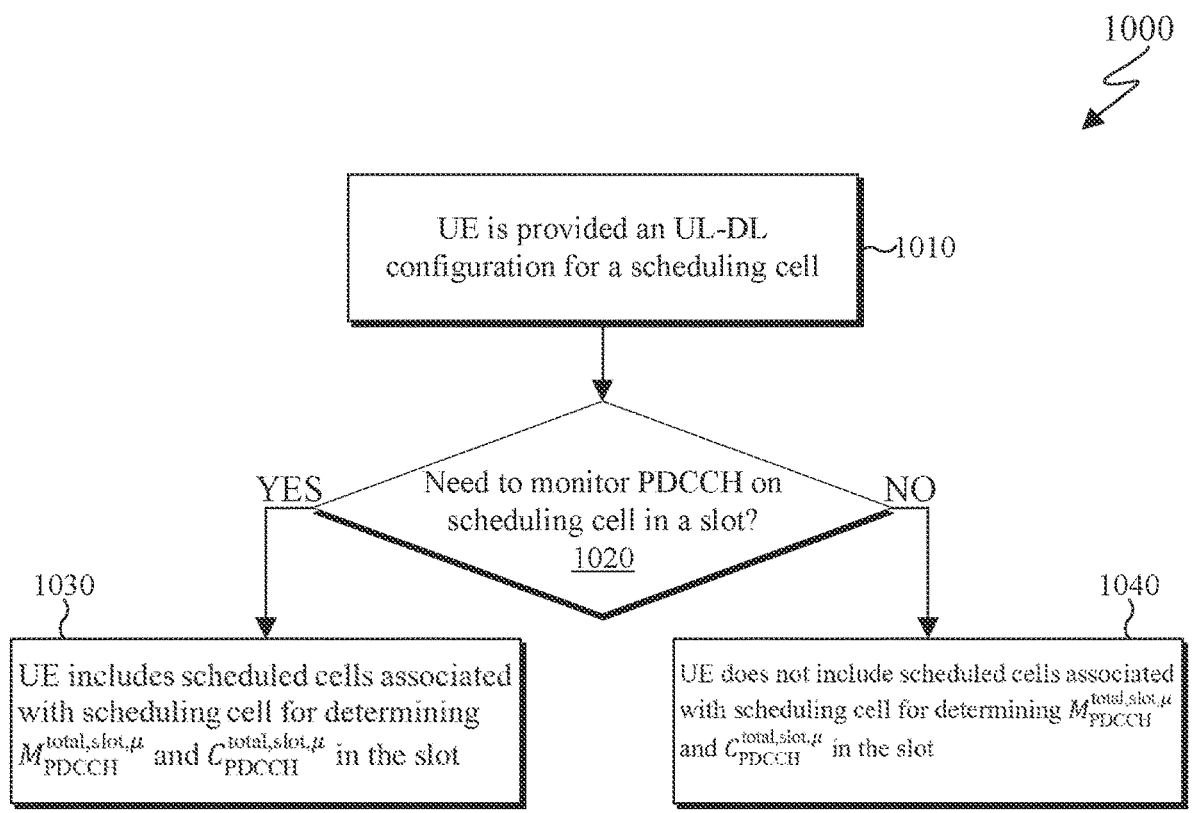
FIG. 10 illustrates an example method for a UE to determine a total number of physical downline control channel (PDCCH) candidates or a total number of non-overlapping control channel elements (CCEs) according to embodiments of the present disclosure.
Figure 11:
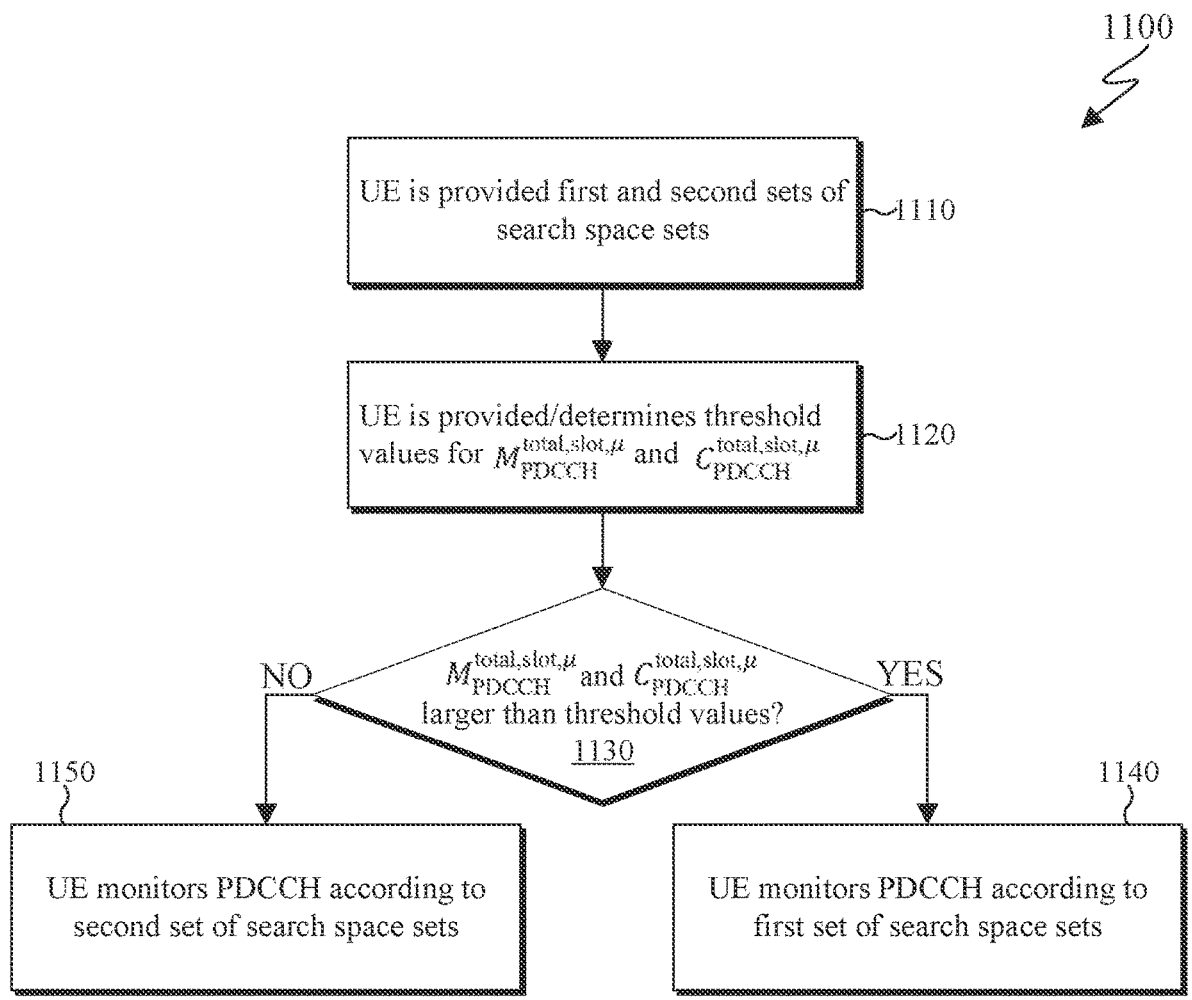
FIG. 11 illustrates an example method for a UE to switch search space sets in a slot according to embodiments of the present disclosure.
Figure 12:
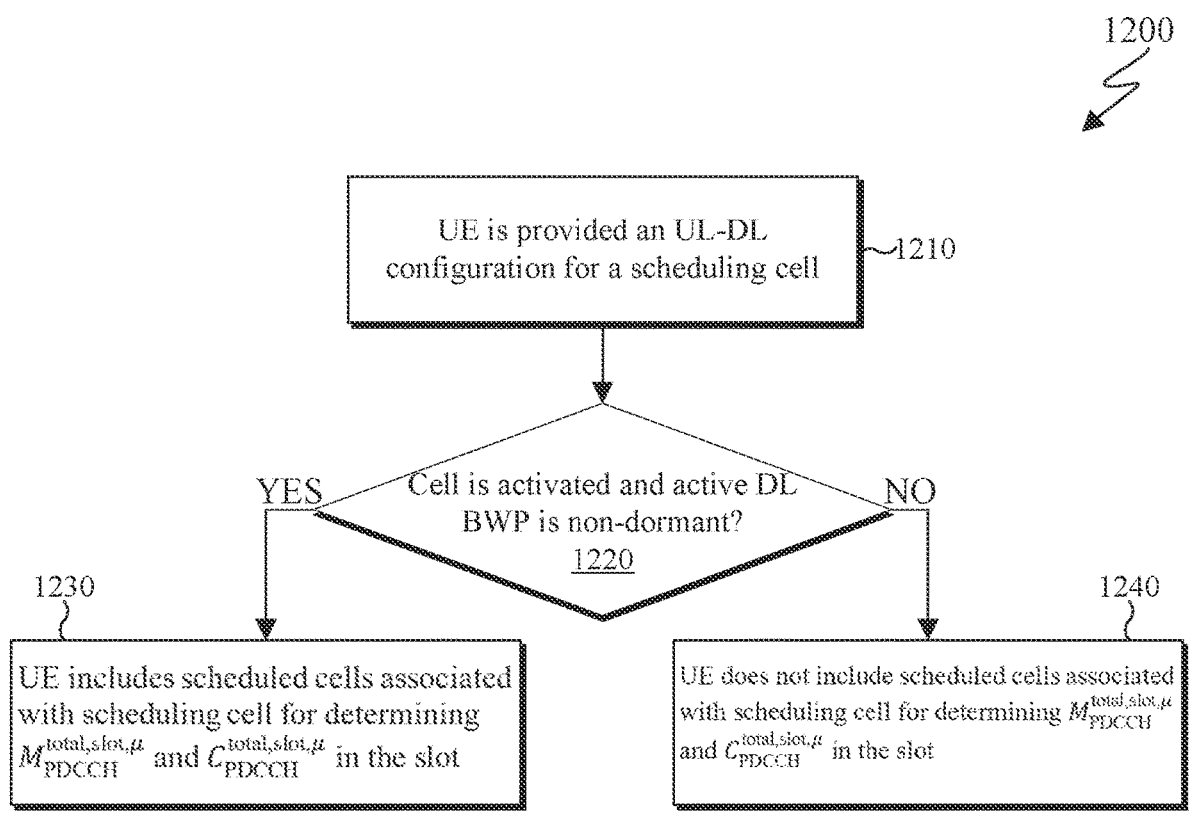
FIG. 12 illustrates an example method for a UE to determine a total number of PDCCH candidates or a total number of non-overlapping CCEs according to embodiments of the present disclosure.
Figure 13:
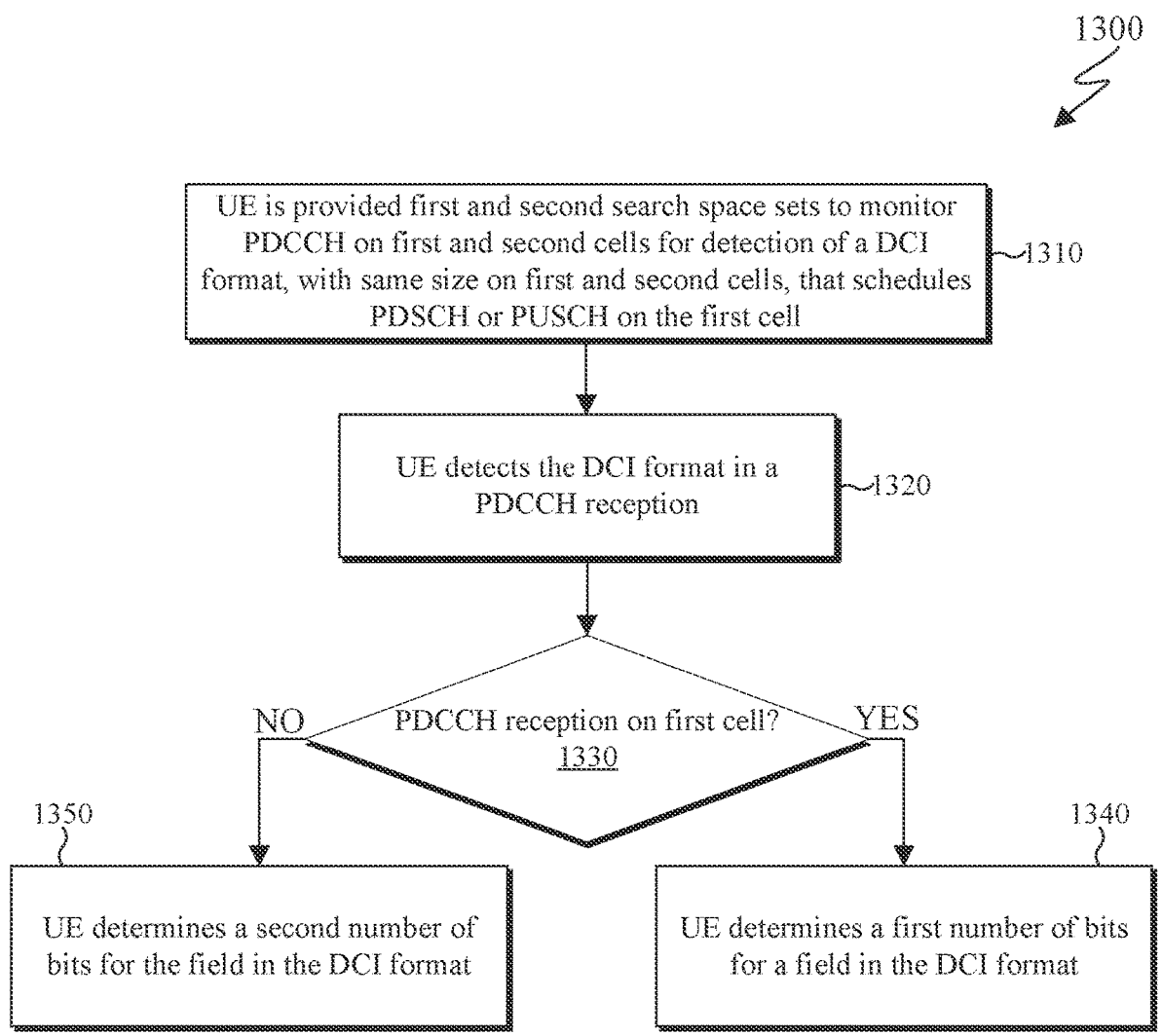
FIG. 13 illustrates an example method for a UE to interpret contents of a DCI format for scheduling on a first cell according to embodiments of the present disclosure.

FIG. 10 illustrates an example method 1000 for a UE to determine a total number of PDCCH candidates or a total number of non-overlapping CCEs according to embodiments of the present disclosure. FIG. 11 illustrates an example method 1100 for a UE to switch search space sets in a slot according to embodiments of the present disclosure. FIG. 12 illustrates an example method 1200 for a UE to determine a total number of PDCCH candidates or a total number of non-overlapping CCEs according to embodiments of the present disclosure. FIG. 13 illustrates an example method 1300 for a UE to interpret contents of a DCI format for scheduling on a first cell according to embodiments of the present disclosure. For example, the steps of the method 1000, 1100, 1200, and 1300 can be performed by any of the UEs 111-116 of FIG. 1, such as the UE 116 of FIG. 3. The method 1000 of FIG. 10, the method 1100 of FIG. 11, the method 1200 of FIG. 12, and the method 1300 of FIG. 13 are for illustration only and other embodiments can be used without departing from the scope of the present disclosure.

The method 1000, as illustrated in FIG. 10, describes a UE determining a total number of PDCCH candidates or a total number of non-overlapping CCEs based on UL-DL configurations on scheduling cells.

In step 1010, a UE is provided an UL-DL configuration for a scheduling cell. In step 1020, the UE determines whether there is a need to monitor PDCCH on scheduling cell in a slot. In certain embodiments, the UE determines whether the UE needs to monitor PDCCH on the scheduling cell in a slot based on whether there is any PDCCH monitoring occasion on the scheduling cell in the slot, as determined by corresponding search space sets, that does not include UL symbols or reserved symbols. When the UE determines that the UE needs to monitor PDCCH on the scheduling cell in the slot, the UE in step 1030 includes the scheduled cells associated with the scheduling cell for determining a total number of PDCCH candidates and a total number of non-overlapped CCEs that the UE can monitor in the slot. Alternatively, when the UE determines that the UE does not need to monitor PDCCH on the scheduling cell in the slot, the UE in step 1040 does not include the scheduled cells associated with the scheduling cell for determining a total number of PDCCH candidates and a total number of non-overlapped CCEs that the UE can monitor in the slot.

The method 1100, as illustrated in FIG. 11, describes a UE switching search space sets in a slot based on a total number of PDCCH candidates or a total number of non-overlapped CCEs in the slot.

In step 1110, a UE is provided by higher layers a first set of search space sets and a second set of search space sets. In step 1120, the UE is either (i) provided, by higher layers, threshold values for a total number of PDCCH candidates and for a total number of non-overlapped CCEs or (ii) determines the threshold values for a total number of PDCCH candidates and for a total number of non-overlapped CCEs. In step 1130, the UE determines whether a total number of PDCCH candidates and a total number of non-overlapped CCEs that the UE can monitor in a slot are larger than the corresponding threshold values. When the total number of PDCCH candidates and a total number of non-overlapped CCEs that the UE can monitor in a slot are larger than the corresponding threshold values (as determined in step 1130), the UE, in step 1140, monitors PDCCH according to the first set of search space sets. Alternatively, when the total number of PDCCH candidates and a total number of non-overlapped CCEs that the UE can monitor in a slot are less than or equal to the corresponding threshold values (as determined in step 1130), the UE, in step 1150 monitors PDCCH according to the second set of search space sets.

In addition to using UL-DL configurations provided by higher layers to adapt a total number of PDCCH candidates and a total number of non-overlapped CCEs based on a number of schedulable cells per slot, such adaptation can also be based on a detection of a DCI format 2_0 that provides a slot structure over a number of slots, such as ten slots. An UL-DL configuration provided by DCI format 2_0 over a number of slots sets to UL, or to DL, or to unavailable a number of symbols indicated as flexible by an UL-DL configuration provided by higher layers. A UE considers that a PDCCH monitoring capability on scheduling cells in a slot where at least one symbol for all PDCCH monitoring occasions on each scheduling cell in the slot is an UL symbol or an unavailable symbol can be allocated to scheduled cells having other scheduling cells in the slot wherein, for each scheduling cell from the other scheduling cells, at least one PDCCH monitoring occasion includes only DL symbols.

An adaptation for a total number of PDCCH candidates or a total number of non-overlapped CCEs for a UE (such as the UE 116) can also be based on activated SCells, or on SCells where an active DL BWP for the UE is not a dormant DL BWP, where the UE can be scheduled PDSCH receptions or PUSCH transmissions. The UE can be indicated by a DCI format, such as a DCI format 2_6 or a DCI format with CRC scrambled by a C-RNTI or by a MAC control element, to activate or deactivate groups of SCells or to switch an active DL BWP from or to a dormant DL BWP for groups of SCells. The UE does not need to monitor PDCCH for scheduling on deactivated groups of SCells or on groups of SCells where the active DL BWP is the corresponding dormant DL BWP as the UE does not expect to be scheduled PDSCH receptions or PUSCH transmissions. Further, depending on the DCI format used to indicate activation/deactivation for SCells in groups of SCells or to indicate a non-dormant/dormant DL BWP as the active DL BWP for SCells in groups of SCells, and on the HARQ-ACK codebook type used for a HARQ-ACK information report, the UE can report HARQ-ACK information in response to corresponding indications.

In certain embodiments, the UE adapts a total number of PDCCH candidates and a total number of non-overlapped CCEs after a time from the PDCCH monitoring occasion where the UE receives the indication to activate/deactivate groups of SCells or to change an active DL BWP to a non-dormant/dormant DL BWP for corresponding SCells in groups of SCells. With reference to slots of a PUCCH transmission, if the UE would transmit a PUCCH with corresponding HARQ-ACK information report in a slot k after a slot of an associated PDCCH reception, then the time can be the slot k of the PUCCH transmission. An additional predetermined time $T_{offset}$ can be included to allow for processing adjustments at the gNB based on the HARQ-ACK information. If the UE would not transmit a PUCCH with corresponding HARQ-ACK information report, the time can be provided by higher layer signaling to the UE or be predetermined in the system operation.

Denoting by $N_{cells,0,deact}^{DL,\mu}$ and by $N_{cells,1,deact}^{DL,\mu}$ a number of scheduled cells from the $N_{cells,0}^{DL,\mu}$ and the $N_{cells,1}^{DL,\mu}$ cells, respectively, that are deactivated for a UE or have a dormant DL BWP as an active DL BWP for the UE, then the UE is not required to monitor more Equation (6) or Equation (7).

$$M_{PDCCH}^{total,slot,\mu} = \left\lfloor N_{cells}^{cap} \cdot M_{PDCCH}^{max,slot,\mu} \cdot \frac{\left(\left(N_{cells,0}^{DL,\mu} - N_{cell,0,deact}^{DL,\mu}\right) + \gamma \cdot \left(N_{cells,1}^{DL,\mu} - N_{cells,1,deact}^{DL,\mu}\right)\right)}{\sum_{j=0}^{3}\left(\left(N_{cells,0}^{DL,\mu} - N_{cells,0,deact}^{DL,\mu}\right) + \gamma \cdot \left(N_{cells,1}^{DL,\mu} - N_{cells,1,deact}^{DL,\mu}\right)\right)} \right\rfloor \quad (6)$$

PDCCH candidates $$C_{PDCCH}^{total,slot,\mu} = \left\lfloor N_{cells}^{cap} \cdot C_{PDCCH}^{max,slot,\mu} \cdot \frac{\left(\left(N_{cells,0}^{DL,\mu} - N_{cell,0,deact}^{DL,\mu}\right) + \gamma \cdot \left(N_{cells,1}^{DL,\mu} - N_{cells,1,deact}^{DL,\mu}\right)\right)}{\sum_{j=0}^{3}\left(\left(N_{cells,0}^{DL,\mu} - N_{cells,0,deact}^{DL,\mu}\right) + \gamma \cdot \left(N_{cells,1}^{DL,\mu} - N_{cells,1,deact}^{DL,\mu}\right)\right)} \right\rfloor \quad (7)$$

non-overlapped CCEs

Here, Equations (6) and (7) are per slot on the active DL BWP(s) of scheduling cell(s) from the $N_{cells,0}^{DL,\mu} + N_{cells,1}^{DL,\mu}$ downlink cells.

The method 1200, as illustrated in FIG. 12, describes a UE determining a total number of PDCCH candidates or a total number of non-overlapping CCEs based on a number of activated scheduled cells, or on a number of activated scheduled cells with active DL BWP other than a dormant BWP.

In step 1210, a UE (such as the UE 116) is provided an indication for activated/deactivated scheduled cells or for a non-dormant/dormant active BWPs for respective activated scheduled cells. In step 1220, the UE determines whether a cell is activated or deactivated or whether or not an active DL BWP of an activated cell in a non-dormant/dormant BWP. When the UE determines that a cell is activated and the active DL BWP is a non-dormant BWP in a slot (step 1220), the UE, in step 1230, includes the cell in the determination of a total number of PDCCH candidates and a total number of non-overlapped CCEs that the UE can monitor in the slot. Alternatively, the UE, in step 1240 does not include the cell in the determination of a total number of PDCCH candidates and a total number of non-overlapped CCEs that the UE can monitor in the slot.

In certain embodiments, a UE considers only activated and deactivated cells, such as when the UE does not support operation with a dormant active DL BWP or when the determination is based only on higher layer signaling and does not depend on signaling by a DCI format. In certain embodiments, a UE considers only whether an active DL BWP is a dormant or non-dormant DL BWP, such as when deactivated cells are viewed as having a dormant active DL BWP.

An adaptation for a total number of PDCCH candidates or for a total number of non-overlapped CCEs for a UE can be based on both UL-DL configurations and on activated/deactivated cells and cells where an active DL BWP for the UE is a non-dormant/dormant DL BWP. Then, for determining $M_{PDCCH}^{total,slot,\mu}$ and $C_{PDCCH}^{total,slot,\mu}$ in a slot, $N_{cells,0,X}^{DL,\mu} + N_{cells,0,deact}^{DL,\mu}$ can be subtracted from $N_{cells,0}^{DL,\mu}$ and $N_{cells,1,x}^{DL,\mu}+N_{cells,1,deact}^{DL,\mu}$ can be subtracted from $N_{cells,1}^{DL,\mu}$, wherein $N_{cells}^{DL,\mu}$ and $N_{cells,1,x}^{DL,\mu}$ include only activated scheduling cells having a non-dormant BWP as an active DL BWP.

Although FIGS. 10-12 illustrate the methods 1000, 1100, and 1200, various changes may be made to FIGS. 10-12. For example, while the method 1000 of FIG. 10, the method 1100 of FIG. 11, and the method 1200 of FIG. 12, are shown as a series of steps, various steps could overlap, occur in parallel, occur in a different order, or occur multiple times. In another example, steps may be omitted or replaced by other steps. For example, steps of the method 1000 can be executed in a different order.

Embodiments of the present disclosure describe maintaining a same number of sizes for DCI formats with CRC scrambled by a C-RNTI for a cell that is self-scheduled or cross-scheduled. The following examples and embodiments describe maintaining a same number of sizes for DCI formats with CRC scrambled by a C-RNTI for a cell that is self-scheduled or cross-scheduled as for a cell that is either self-scheduled or cross-scheduled.

An embodiment of the present disclosure considers an alignment of a DCI format size for scheduling PDSCH receptions by or PUSCH transmissions from a UE on a first cell, such as a primary cell, through a PDCCH reception on the first cell or on a second cell, such as an auxiliary SCell.

Due to UE implementation complexity requirements, a total number of DCI format sizes that a UE can be expected to decode should be limited. A typical limit is four sizes of DCI formats per scheduled cell wherein up to three of the four sizes can be for DCI formats with CRC scrambled with C-RNTI for scheduling on a scheduled cell.

In certain embodiments, when a scheduled cell for a UE is either self-scheduled or scheduled from another cell (cross-scheduled), contents of a DCI format scheduling PDSCH receptions by or PUSCH transmissions from the UE are generally same. It is noted that possible exception is associated with a cross-carrier indicator (CIF) field at least when the scheduled cell is not a scheduling cell to any cell other than itself. The following approaches consider alignment for a size of a DCI format when the DCI format used to schedule PDSCH receptions or PUSCH transmissions on a first cell can be provided by a PDCCH reception on the first cell (self-scheduling) or on a second cell (cross-scheduling).

In a first approach, a CIF field is configured in a DCI format for scheduling on the first cell when the DCI format is provided by a PDCCH reception on the first cell even when the first cell is not a scheduling cell for any other cell. A size of the CIF field is same as a size of the CIF field in the DCI format provided by a PDCCH reception on the second cell. For example, a value of the CIF field can be 0 or can be unspecified.

In a second approach, a CIF field is not included in a DCI format for scheduling on the first cell and a configuration of the sizes of the fields of the DCI format is separate for when the DCI format is associated with a first search space set for PDCCH receptions on the first cell and when the DCI format is associated with a second search space set for PDCCH receptions on the second cell. The separate configurations can be such that a size of the DCI format is same for the first and second search space sets but fields of the DCI formats can have different sizes depending on whether a corresponding PDCCH in received on the first cell or on the second cell. For example, when the DCI format is provided by a PDCCH reception according to the first search space set on the first cell, the DCI format includes a redundancy version (RV) field of 2 bits while when the DCI format is provided by a PDCCH reception according to the second search space set on the second cell, the DCI format does not include a RV field (0 bits).

In a third approach, a CIF is not included in the DCI format regardless of whether the DCI format is provided by a PDCCH reception on the first cell or on the second cell. Such a realization can exist when the DCI format size is different than a DCI format size for scheduling on the second cell or for scheduling on any other cell that has the second cell as the scheduling cell. For example, when a BWP size of the first cell is smaller than a BWP size of any other cell that has the second cell as a scheduling cell, it is expected that the size of the DCI format for scheduling on the first cell is smaller than the size of the DCI format for scheduling on any of the other cells having the second cell as the scheduling cell. Then, a UE can monitor PDCCH for different sizes of a DCI format depending on whether the DCI format is for scheduling on the first cell or for scheduling on another cell and the UE can identify the scheduled cell based on the size of a detected DCI format without a need of a CIF field.

Either one of the above three approaches, including combinations, can apply depending on the operating conditions, such as (i) when the first cell is a scheduling cell for cells other than the first cell, (ii) when a reduced functionality for some fields can be used when scheduling is from the second cell and the fields can have smaller size than when scheduling is from the first cell, or (iii) when the BWP sizes are substantially different between the first cell and the second cell so that a size of the DCI format for scheduling on the first cell can be different than a size of the DCI format for scheduling on the second cell. For example, some fields for scheduling on the first cell, such as a RV field, can have larger size in a DCI format provided by a PDCCH on the first cell than by a PDCCH on the second cell, while a CIF can have smaller, non-zero, size in the DCI format provided by a PDCCH on the first cell than by a PDCCH on the second cell.

FIG. 13 illustrates an example method 1300 for a UE to interpret contents of a DCI format for scheduling on a first cell according to embodiments of the present disclosure. For example, the steps of the method 1300 can be performed by any of the UEs 111-116 of FIG. 1, such as the UE 116 of FIG. 3. The method 1300 of FIG. 13 is for illustration only and other embodiments can be used without departing from the scope of the present disclosure.

The method 1300, as illustrated in FIG. 13, describes that a UE interprets contents of a DCI format for scheduling on a first cell depending on whether the UE receives a PDCCH providing the DCI format on the first cell or on a second cell.

In step 1310, a UE (such as the UE 116) is provided first search space sets to monitor PDCCH on a first cell and on a second cell. In this example, a PDCCH provides a DCI format with same size on the first cell and on the second cell. The DCI format schedules a PDSCH reception or a PUSCH transmission from the UE on the first cell. In step 1320, the UE detects the DCI format in a PDCCH reception. In step 1330, the UE determines whether the PDCCH reception is on the first cell or on the second cell. When the PDCCH reception is on the first cell (as determined in step 1330), the UE, in step 1340, determines a first number of bits for a field in the DCI format. When the PDCCH reception is on the second cell (as determined in step 1330), the UE, in step 1350, determines a second number of bits for the field in the DCI format.

Although FIG. 13 illustrates the method 1300, various changes may be made to FIG. 13. For example, while the method 1300 of FIG. 13 is shown as a series of steps, various steps could overlap, occur in parallel, occur in a different order, or occur multiple times. In another example, steps may be omitted or replaced by other steps. For example, steps of the method 1300 can be executed in a different order.

Embodiments of the present disclosure also describe search space set dropping. The following examples and embodiments describe search space set dropping when a primary cell is self-scheduled or cross-scheduled from a secondary cell.

Embodiments of the present disclosure consider a procedure for a UE to determine search space set dropping on a primary cell or on an auxiliary SCell.

In certain embodiments, when a UE is scheduled on a primary cell, either from PDCCH receptions on the primary cell or from PDCCH receptions on an auxiliary SCell, one underlying reason is that a number of resources on the primary cell for PDCCH receptions is limited. For example, when NR coexists with LTE and all PDCCH transmissions occur in the first three symbols of a slot, corresponding resources have to be shared among UEs operating with LTE RAT and UEs operating with NR RAT. Then, a first option for a distribution of resources is to allocate the first two symbols of a slot for LTE PDCCH receptions and the third symbol of the slot for NR PDCCH receptions. A second option is to allocate the first symbol of a slot for LTE PDCCH receptions and the second and third symbols of the slot for NR PDCCH receptions. For either option, PDCCH monitoring for a UE can be dynamically offloaded to the auxiliary SCell and, based on resource availability for PDCCH transmissions, a gNB can schedule the UE for PDSCH receptions or PUSCH transmissions on the primary cell either through a PDCCH reception on the primary cell or through a PDCCH reception on the auxiliary SCell.

In addition to PDCCHs scheduling PDSCH receptions to or PUSCH transmission from a UE, the UE needs to monitor PDCCH according to a Type3-PDCCH CSS for detection of DCI formats such as DCI format 2_0, DCI format 2_2, DCI format 2_3, and so on. As such DCI formats need to be detected by groups of UEs, a corresponding detection reliability needs to be large at low signal-to-interference and noise ratios (SINRs), thereby requiring a large CCE aggregation level for a corresponding PDCCH. An improved coverage for such DCI formats is difficult to achieve when resources for a corresponding PDCCH are contained in a single symbol of a slot. Also, a number of CCEs may not be large enough for a serving gNB to simultaneously transmit multiple PDCCHs according to a Type3-PDCCH CSS and according to USS of respective UEs.

Embodiments of the present disclosure take into consideration that to avoid the above operational constraint above, a gNB (such as the BS 102) can configure a UE to monitor PDCCH for Type3-PDCCH CSS on the auxiliary SCell, in addition to or instead of the primary cell. Then, as a UE typically does not monitor PDCCH on the primary cell according to other CSS types in every slot, such as for system information or random access response or paging, when the UE monitors PDCCH according to a USS for DCI formats scheduling PDSCH receptions or PUSCH transmissions, search space set dropping need not apply on the primary cell but instead can apply on the auxiliary SCell.

Determination for search space set dropping involves material computational complexity by a UE for a number of non-overlapping CCEs and a number of PDCCH candidates. Also, the UE performs the computations in every slot. To avoid a mandatory increase in computational requirements for a UE, the UE can declare a capability to perform search space set dropping on only one cell or on two cells. A serving gNB can use the reported UE capability in the configuration of search space sets for PDCCH monitoring according to CSS or USS. For example, for a UE indicating a capability to perform search space set dropping on two cells, such as the primary cell and an auxiliary SCell, a serving gNB can have increased flexibility in the configuration of search space sets without a material concern for overbooking a PDCCH monitoring capability of the UE on a cell as then the UE can be expected to drop search space sets that would result to the UE monitoring more PDCCH candidates than $\min(M_{PDCCH}^{max,slot,\mu}, M_{PDCCH}^{total,slot,\mu})$ or more than $\min(C_{PDCCH}^{max,slot,\mu}, C_{PDCCH}^{total,slot,\mu})$ non-overlapped CCEs per slot for CORESETs with same CORESETPoolIndex value.

A serving gNB can also configure the UE to perform search space set dropping only on the primary cell or only on the auxiliary SCell. An additional condition can be for the UE to either indicate a capability to perform search space set dropping only on one cell or for the UE to not indicate such capability and then the default one is that the UE can perform search space set dropping on only one cell. Alternatively, the UE performs search space set dropping only on a cell where the UE is configured to monitor PDCCH according to a Type3-PDCCH CSS. If the UE is configured to monitor PDCCH according to Type3-PDCCH CSS on both the primary cell and on the auxiliary SCell, the gNB can configure to the UE the cell where the UE performs search space set dropping.

Figure 14:
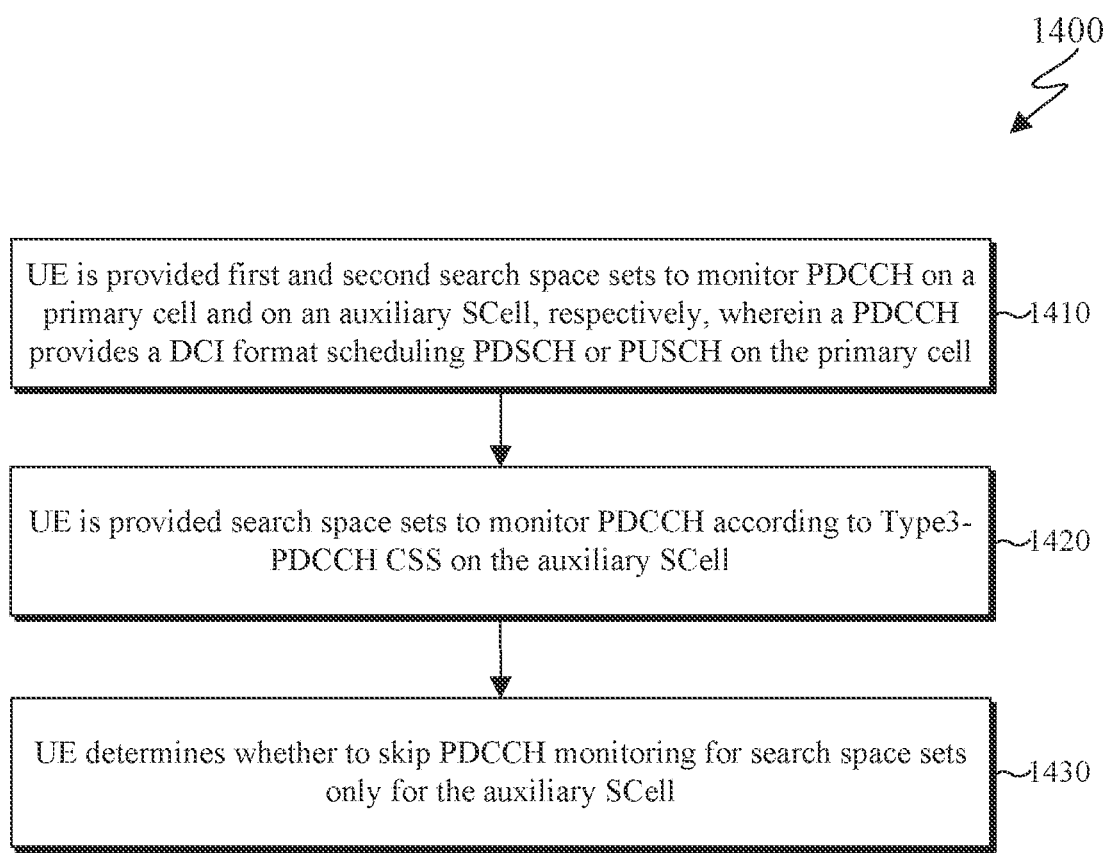
FIG. 14 illustrates an example method for a UE to determine a search space set dropping procedure according to embodiments of the present disclosure.

FIG. 14 illustrates an example method 1400 for a UE to determine a search space set dropping procedure according to embodiments of the present disclosure. For example, the steps of the method 1300 can be performed by any of the UEs 111-116 of FIG. 1, such as the UE 116 of FIG. 3. The method 1300 of FIG. 13 is for illustration only and other embodiments can be used without departing from the scope of the present disclosure.

In step 1410, a UE (such as the UE 116) is provided first and second search space sets to monitor PDCCH on a primary cell and on an auxiliary SCell, respectively. A PDCCH provides a DCI format that schedules a PDSCH reception or a PUSCH transmission on the primary cell. In step 1420, the UE is also provided search space sets to monitor PDCCH according to Type3-PDCCH CSS on the auxiliary SCell. In step 1430, the UE applies a procedure in a slot to determine whether PDCCH monitoring according to USS needs to be skipped for search space sets wherein the procedure applies only for PDCCH receptions on the auxiliary SCell.

Although FIG. 14 illustrates the method 1400, various changes may be made to FIG. 14. For example, while the method 1400 of FIG. 14 is shown as a series of steps, various steps could overlap, occur in parallel, occur in a different order, or occur multiple times. In another example, steps may be omitted or replaced by other steps. For example, steps of the method 1400 can be executed in a different order.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method for processing downlink control information (DCI) formats, the method comprising:
   receiving a first physical downlink control channel (PDCCH) on a first cell that provides a first DCI format; and
   determining a set of fields in the first DCI format, wherein:
      the first DCI format schedules a first physical downlink shared channel (PDSCH) reception, or a first physical uplink shared channel (PUSCH) transmission, only on the first cell,
      the set of fields includes a carrier indicator field (CIF) when a second DCI format provided by a second PDCCH reception on a second cell can schedule a second PDSCH reception, or a second PUSCH transmission, on the first cell, and
      the set of fields does not include the CIF when the second DCI format provided by the second PDCCH reception on the second cell cannot schedule the second PDSCH reception, or the second PUSCH transmission, on the first cell.

2. The method of claim 1, further comprising:
   receiving:
      information for first search space sets for first PDCCH receptions on the first cell that provide first DCI formats for scheduling first PDSCH receptions or first PUSCH transmissions on the first cell, and
      information for second search space sets for second PDCCH receptions on the second cell that provide second DCI formats for scheduling second PDSCH receptions or second PUSCH transmissions on the first cell; and
   determining search space sets for dropping corresponding PDCCH receptions only from the first search space sets.

3. The method of claim 1, further comprising:
   receiving:
      first information for first search space sets for first PDCCH receptions on the first cell that provide first DCI formats for scheduling first PDSCH receptions or first PUSCH transmissions on the first cell,
      second information for second search space sets for second PDCCH receptions on the second cell that provide second DCI formats for scheduling second PDSCH receptions or second PUSCH transmissions on the first cell, and
      third information to determine search space sets for dropping corresponding PDCCH receptions on one of the first cell and the second cell; and
   determining the search space sets for dropping the corresponding PDCCH receptions on one of the first cell and the second cell based on the third information.

4. The method of claim 1, further comprising:
   receiving:
      information for first search space sets for first PDCCH receptions on the first cell that provide first DCI formats for scheduling first PDSCH receptions or first PUSCH transmissions on the first cell,
      information for second search space sets for second PDCCH receptions on the second cell that provide second DCI formats for scheduling second PDSCH receptions or second PUSCH transmissions on the first cell; and
   transmitting information for a capability to determine search space sets for dropping corresponding PDCCH receptions for one of:
      on only one of the first cell or the second cell, and
      on both the first cell and the second cell.

5. The method of claim 1, wherein the first cell is a primary cell and the second cell is a secondary cell.

6. The method of claim 1, further comprising:
   receiving information for a set of cells for scheduling PDSCH receptions or PUSCH transmissions by DCI formats provided by PDCCH receptions on the second cell; and
   determining a total number of the PDCCH receptions on the second cell based on activated cells from the set of cells.

7. The method of claim 1, further comprising:
   receiving information for a set of cells for scheduling PDSCH receptions or PUSCH transmissions by DCI formats provided by PDCCH receptions on the second cell; and
   determining a total number of the PDCCH receptions on the second cell based on:
      activated cells from the set of cells, and
      cells with respective active downlink bandwidth parts (BWPs) or active uplink BWPs where respective PDSCH receptions or PUSCH transmissions are enabled.

8. A user equipment (UE) comprising:
   a transceiver configured to receive a first physical downlink control channel (PDCCH) on a first cell that provides a first downlink control information (DCI) format; and
   a processor operably connected to the transceiver, the processor configured to determine a set of fields in the first DCI format, wherein:
      the first DCI format schedules a first physical downlink shared channel (PDSCH) reception, or a first physical uplink shared channel (PUSCH) transmission, only on the first cell,
      the set of fields includes a carrier indicator field (CIF) when a second DCI format provided by a second PDCCH reception on a second cell can schedule a second PDSCH reception, or a second PUSCH transmission, on the first cell, and
      the set of fields does not include the CIF when the second DCI format provided by the second PDCCH reception on the second cell cannot schedule the second PDSCH reception, or the second PUSCH transmission, on the first cell.

9. The UE of claim 8, wherein:
   the transceiver is further configured to receive:
      information for first search space sets for first PDCCH receptions on the first cell that provide first DCI formats for scheduling first PDSCH receptions or first PUSCH transmissions on the first cell, and
      information for second search space sets for second PDCCH receptions on the second cell that provide second DCI formats for scheduling second PDSCH receptions or second PUSCH transmissions on the first cell; and the processor is further configured to determine search space sets for dropping corresponding PDCCH receptions only from the first search space sets.

10. The UE of claim 8, wherein:
the transceiver is further configured to receive:
first information for first search space sets for first PDCCH receptions on the first cell that provide first DCI formats for scheduling first PDSCH receptions or first PUSCH transmissions on the first cell,
second information for second search space sets for second PDCCH receptions on the second cell that provide second DCI formats for scheduling second PDSCH receptions or second PUSCH transmissions on the first cell, and
third information to determine search space sets for dropping corresponding PDCCH receptions on one of the first cell and the second cell; and
the processor is further configured to determine search space sets for dropping corresponding PDCCH receptions on one of the first cell and the second cell based on the third information.

11. The UE of claim 8, wherein the transceiver is further configured to:
receive:
information for first search space sets for first PDCCH receptions on the first cell that provide first DCI formats for scheduling first PDSCH receptions or first PUSCH transmissions on the first cell,
information for second search space sets for second PDCCH receptions on the second cell that provide second DCI formats for scheduling second PDSCH receptions or second PUSCH transmissions on the first cell; and
transmit information for a capability to determine search space sets for dropping corresponding PDCCH receptions for one of:
on only one of the first cell or the second cell, and
on both the first cell and the second cell.

12. The UE of claim 8, wherein the first cell is a primary cell and the second cell is a secondary cell.

13. The UE of claim 8, wherein:
the transceiver is further configured to receive information for a set of cells for scheduling PDSCH receptions or PUSCH transmissions by DCI formats provided by PDCCH receptions on the second cell; and
the processor is further configured to determine a total number of the PDCCH receptions on the second cell based on activated cells from the set of cells.

14. The UE of claim 8, wherein:
the transceiver is further configured to receive information for a set of cells for scheduling PDSCH receptions or PUSCH transmissions by DCI formats provided by PDCCH receptions on the second cell; and
the processor is further configured to determine a total number of the PDCCH receptions on the second cell based on:
activated cells from the set of cells, and
cells with respective active downlink bandwidth parts (BWPs) or active uplink BWPs where respective PDSCH receptions or PUSCH transmissions are enabled.

15. A base station comprising:
a transceiver configured to transmit a first physical downlink control channel (PDCCH) on a first cell that provides a first downlink control information (DCI) format; and a processor operably connected to the transceiver, the processor configured to determine a set of fields in the first DCI format, wherein:
the first DCI format schedules a first physical downlink shared channel (PDSCH) transmission, or a first physical uplink shared channel (PUSCH) reception, only on the first cell,
the set of fields includes a carrier indicator field (CIF) when a second DCI format provided by a second PDCCH transmission on a second cell can schedule a second PDSCH transmission, or a second PUSCH reception, on the first cell, and
the set of fields does not include the CIF when the second DCI format provided by the second PDCCH transmission on the second cell cannot schedule the second PDSCH transmission, or the second PUSCH reception, on the first cell.

16. The base station of claim 15, wherein:
the transceiver is further configured to transmit:
information for first search space sets for first PDCCH transmissions on the first cell that provide first DCI formats for scheduling first PDSCH transmissions or first PUSCH receptions on the first cell, and
information for second search space sets for second PDCCH transmissions on the second cell that provide second DCI formats for scheduling second PDSCH transmissions or second PUSCH receptions on the first cell; and
the processor is further configured to determine search space sets for dropping corresponding PDCCH transmissions only from the first search space sets.

17. The base station of claim 15, wherein:
the transceiver is further configured to receive:
first information for first search space sets for first PDCCH transmissions on the first cell that provide first DCI formats for scheduling first PDSCH transmissions or first PUSCH receptions on the first cell,
second information for second search space sets for second PDCCH transmissions on the second cell that provide second DCI formats for scheduling second PDSCH transmissions or second PUSCH receptions on the first cell, and
third information to determine search space sets for dropping corresponding PDCCH transmissions on one of the first cell and the second cell; and
the processor is further configured to determine search space sets for dropping corresponding PDCCH transmissions on one of the first cell and the second cell based on the third information.

18. The base station of claim 15, wherein the transceiver is further configured to:
transmit:
information for first search space sets for first PDCCH transmissions on the first cell that provide first DCI formats for scheduling first PDSCH transmissions or first PUSCH receptions on the first cell,
information for second search space sets for second PDCCH transmissions on the second cell that provide second DCI formats for scheduling second PDSCH transmissions or second PUSCH receptions on the first cell; and
receive information for a capability to determine search space sets for dropping corresponding PDCCH transmissions for one of:
on only one of the first cell or the second cell, and
on both the first cell and the second cell.

19. The base station of claim 15, wherein the first cell is a primary cell and the second cell is a secondary cell.

20. The base station of claim 15, wherein:
   the transceiver is further configured to transmit information for a set of cells for scheduling PDSCH transmissions or PUSCH receptions by DCI formats provided by PDCCH transmissions on the second cell; and
   the processor is further configured to determine a total number of the PDCCH transmissions on the second cell based on activated cells from the set of cells.

* * * * *